(12) United States Patent
Kim

(10) Patent No.: US 6,670,909 B2
(45) Date of Patent: Dec. 30, 2003

(54) ULTRA-WIDEBAND SMART SENSOR INTERFACE NETWORK AND METHOD

(75) Inventor: Jonnathan H. Kim, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 09/760,922

(22) Filed: Jan. 16, 2001

(65) Prior Publication Data

US 2002/0130809 A1 Sep. 19, 2002

(51) Int. Cl.[7] ............................. G01S 7/35; G01S 13/00
(52) U.S. Cl. ............................. 342/50; 342/21; 342/42; 342/52; 342/58; 342/60; 342/118; 342/125; 342/175; 342/195
(58) Field of Search ............................. 342/21, 22, 27, 342/28, 42–45, 50–61, 118, 125, 175, 192–197; 375/256; 340/870.02, 870.03

(56) References Cited

U.S. PATENT DOCUMENTS

| | | | | |
|---|---|---|---|---|
| 3,705,385 A | * | 12/1972 | Batz ........................... | 342/50 X |
| 3,754,250 A | * | 8/1973 | Bruner ........................ | 342/44 |
| 4,031,513 A | * | 6/1977 | Simciak ..................... | 342/50 X |
| 4,641,317 A | | 2/1987 | Fullerton | |
| 4,743,906 A | | 5/1988 | Fullerton ..................... | 342/27 |
| 4,813,057 A | | 3/1989 | Fullerton | |
| 4,979,186 A | | 12/1990 | Fullerton | |
| 5,363,108 A | | 11/1994 | Fullerton ..................... | 342/27 |
| 5,543,797 A | * | 8/1996 | Hochstein et al. ............. | 342/42 |
| 5,677,927 A | | 10/1997 | Fullerton et al. | |
| 5,687,169 A | | 11/1997 | Fullerton | |
| 5,745,049 A | * | 4/1998 | Akiyama et al. ......... | 342/42 X |
| 5,748,104 A | * | 5/1998 | Argyroudis et al. ... | 340/870.02 |
| 5,801,643 A | * | 9/1998 | Williams et al. ....... | 340/870.02 |
| 5,832,035 A | | 11/1998 | Fullerton | |
| 5,892,758 A | * | 4/1999 | Argyroudis ............. | 340/870.02 |
| 5,910,776 A | * | 6/1999 | Black ........................ | 342/44 X |
| 6,111,536 A | | 8/2000 | Richards et al. ............ | 342/125 |
| 6,133,876 A | | 10/2000 | Fullerton et al. ............ | 342/375 |
| 6,177,903 B1 | | 1/2001 | Fullerton et al. ............. | 342/28 |
| 6,218,979 B1 | | 4/2001 | Barnes et al. ................. | 342/28 |
| 6,304,623 B1 | | 10/2001 | Richards et al. | |
| 6,421,389 B1 | | 7/2002 | Jett et al. | |

OTHER PUBLICATIONS

U.S. patent application—Ser. No. 09/592,290 (filed Jun. 12, 2000).

U.S. patent application—Ser. No. 09/591,691 (filed Jun. 12, 2000).

U.S. patent application—Ser. No. 09/592,289 (filed Jun. 12, 2000).

U.S. patent application—Ser. No. 09/592,248 (filed Jun. 12, 2000).

(List continued on next page.)

Primary Examiner—Bernarr E. Gregory
(74) Attorney, Agent, or Firm—William J. Tucker

(57) ABSTRACT

A network, sensor and method are provided that utilize the capabilities of impulse radio technology to help monitor and/or control the environment within a building. In particular, the network includes a sensor attached to a first impulse radio unit that is capable of transmitting an impulse radio signal containing sensor related information to a second impulse radio unit. The second impulse radio unit is attached to a control station that uses the sensor related information (e.g., environmental related information, safety related information or surveillance related information) to monitor and/or control the environment within a building. In one aspect of the present invention, the control system can better control and monitor the environment within the building because the sensor may be moved around within the building and reference impulse radio units may interact with the first impulse radio unit to enable the determination of the current position of the sensor.

20 Claims, 19 Drawing Sheets

OTHER PUBLICATIONS

U.S. patent application—Ser. No. 09/591,690 (filed Jun. 12, 2000).
U.S. patent application—Ser. No. 09/592,288 (filed Jun. 12, 2000).
U.S. patent application—Ser. No. 09/587,033 (filed Jun. 2, 1999).
U.S. patent application—Ser. No. 09/586,163 (filed Jun. 2, 1999).
U.S. patent application—Ser. No. 09/537,264 (filed Mar. 29, 2000).
U.S. patent application—Ser. No. 09/538,292 (filed Mar. 29, 2000).
U.S. patent application—Ser. No. 09/332,501 (filed Jun. 14, 1999).
U.S. patent application—Ser. No. 09/537,692 (filed Mar. 29, 2000).
U.S. patent application—Ser. No. 09/592,250 (filed Jun. 12, 2000).

* cited by examiner

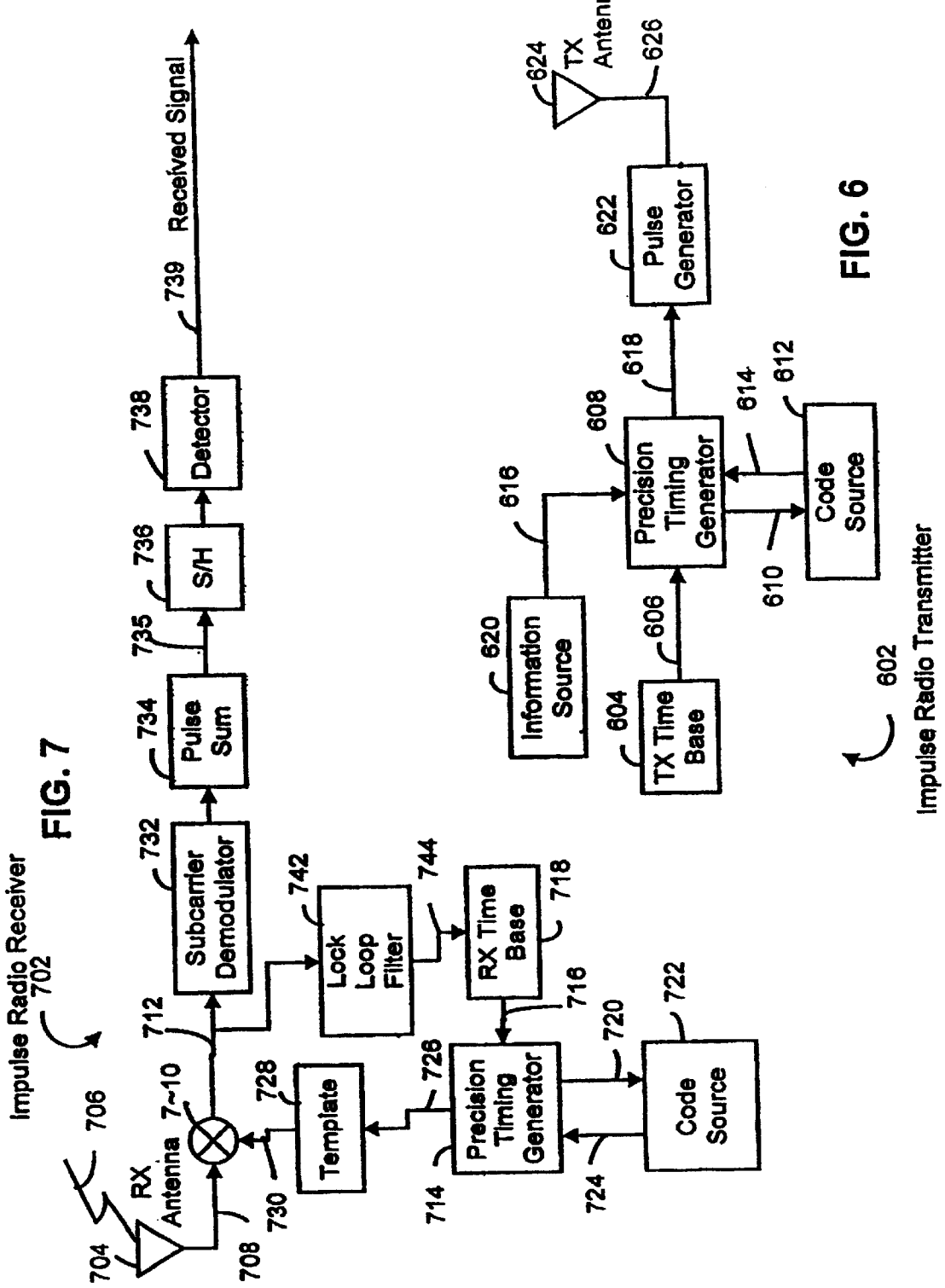

CORRESPONDING TO EACH Δt

ULTRA-WIDEBAND SMART SENSOR INTERFACE NETWORK AND METHOD

BACKGROUND OF THE INVENTION

1. Field of the Invention

The present invention relates in general to sensors and, in particular, to a network, sensor and method capable of using impulse radio technology to help monitor and/or control the environment within a building.

2. Description of Related Art

In a home, office or industrial environment, it would be desirable to let people better monitor and/or control the environment within a building. Unfortunately, to date there does not appear to be any sensor that effectively enables people to monitor and control the environment outside or within a building. For instance, most sensors (e.g., thermostats) are hard wired to a controller (e.g., heating/cooling controller) which can be problematical in that only a few hard-wired sensors are typically used to control the environment (e.g., temperature) within the entire building. In such a situation, it is common for one room or area of the building to be cold while another room or area of the building is hot. Another problem with hard-wired sensors is that there is a large expense to install these sensors.

To address the problems with hard-wired sensors, sensors that have a wireless interface with their controllers have been developed and sold. However, new problems have arisen with the use of wireless sensors because with standard radio transmissions there are often problematical "dead zones" within a building that may interfere with the wireless link between the sensor and the controller. The "dead zones" are caused by the closed structure of the building, which can make it difficult for a sensor attached to standard radio transmitter to maintain contact with a standard radio receiver attached to a controller. In particular, the standard radio signals sent from the standard radio transmitter attached to the sensor may not be able to penetrate a certain wall or floor within the building and as such may not reach the standard radio receiver attached to the controller. This is especially true if the sensor can be moved to different locations within the building.

The closed structure of the building may also cause "multipath interference" which can interfere with standard radio transmission between the sensor and the controller. Multipath interference is an error caused by the interference of a standard radio signal that has reached a standard radio receiver by two or more paths. Essentially, the standard radio receiver may not be able to demodulate the standard radio signal because the transmitted radio signal effectively cancels itself out by bouncing of walls and floors of the building before reaching the standard radio receiver. Accordingly, there has been a persistent need to overcome the shortcomings of traditional sensors by providing a network, sensor and method that can effectively monitor and/or control the environment within a building.

BRIEF DESCRIPTION OF THE INVENTION

The present invention includes a network, sensor and method that can use impulse radio technology to help monitor and/or control the environment within a building. In particular, the network includes a sensor attached to a first impulse radio unit that is capable of transmitting an impulse radio signal containing sensor related information to a second impulse radio unit. The second impulse radio unit is attached to a control station that uses the sensor related information (e.g., environmental related information, safety related information or surveillance related information) to monitor and/or control the environment within a building. In one aspect of the present invention, the control system can better control and monitor the environment within the building because the sensor may be moved around within the building and reference impulse radio units may interact with the first impulse radio unit to enable the determination of the current position of the sensor.

BRIEF DESCRIPTION OF THE DRAWINGS

A more complete understanding of the present invention may be had by reference to the following detailed description when taken in conjunction with the accompanying drawings wherein:

FIG. 6 illustrates a representative impulse radio transmitter functional diagram.

FIG. 7 illustrates a representative impulse radio receiver functional diagram.

DETAILED DESCRIPTION OF THE INVENTION

Figure 1B:
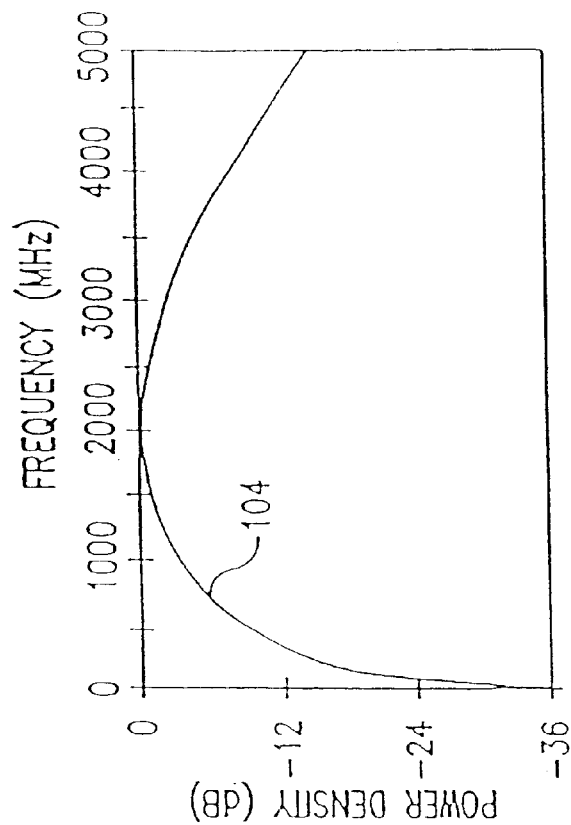
FIG. 1B illustrates the frequency domain amplitude of the Gaussian Monocycle of FIG. 1A.

The present invention includes a network, sensor and method that can use impulse radio technology to help monitor and/or control the environment within a building. The use of impulse radio technology to help monitor and/or control the environment within a building is a significant improvement over the state-of-art. This significant improvement over the state-of-art is attributable, in part, to the use of an emerging, revolutionary ultra wideband technology (UWB) called impulse radio communication technology (also known as impulse radio).

Impulse radio was first fully described in a series of patents, including U.S. Pat. Nos. 4,641,317 (issued Feb. 3, 1987), 4,813,057 (issue Mar. 14, 1989), 4,979,186 (issued Dec. 18, 1990) and 5,363,108 (issued Nov. 8, 1994) to Larry W. Fullerton. A second generation of impulse radio patents includes U.S. Pat. Nos. 5,677,927 (issued Oct. 14, 1997),5,687,169 (issued Nov. 11, 1997) and 5,832,035 (issued Nov. 3, 1998) to Fullerton et al.

Uses of impulse radio systems are described in U.S. Pat. No. 6,177,903 entitled, "System and Method for Intrusion Detection using a Time Domain Radar Array" and U.S. Pat. No. 6,218,979 entitled, "Wide Area Time Domain Radar Array" both of which to the assignee of the present invention. These patents are incorporated herein by reference.

Impulse Radio Basics

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a code component. Generally, conventional spread spectrum systems employ codes to spread the normally narrow band information signal over a relatively wide band of frequencies. A conventional spread spectrum receiver correlates these signals to retrieve the original information signal. Unlike conventional spread spectrum systems, in impulse radio communications codes are not needed for energy spreading because the monocycle pulses themselves have an inherently wide bandwidth. Instead, codes are used for channelization, energy smoothing in the frequency domain, resistance to interference, and reducing the interference potential to nearby receivers.

The impulse radio receiver is typically a direct conversion receiver with a cross correlator front end which coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step func tion into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,

σ is a time scaling parameter, t is time, $f_{mono}(t)$ is the waveform voltage, and e is the natural logarithm base.

Figure 1A:
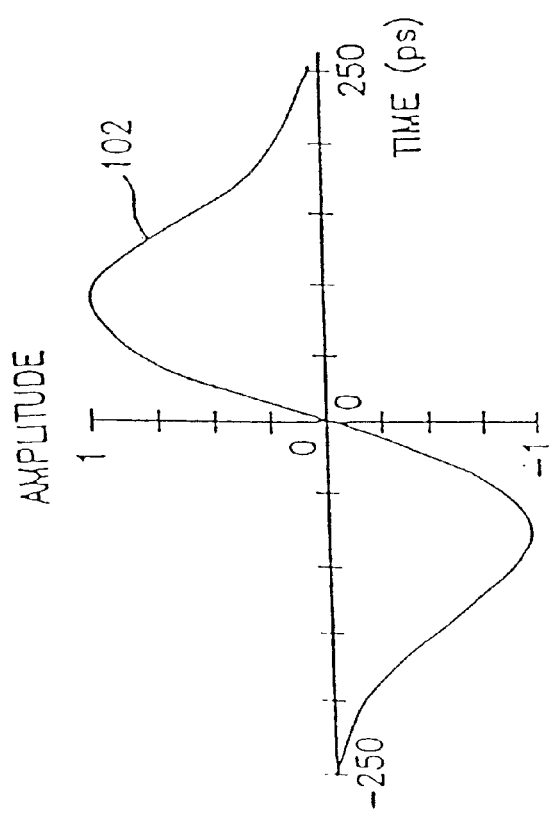
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)^{3/2}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
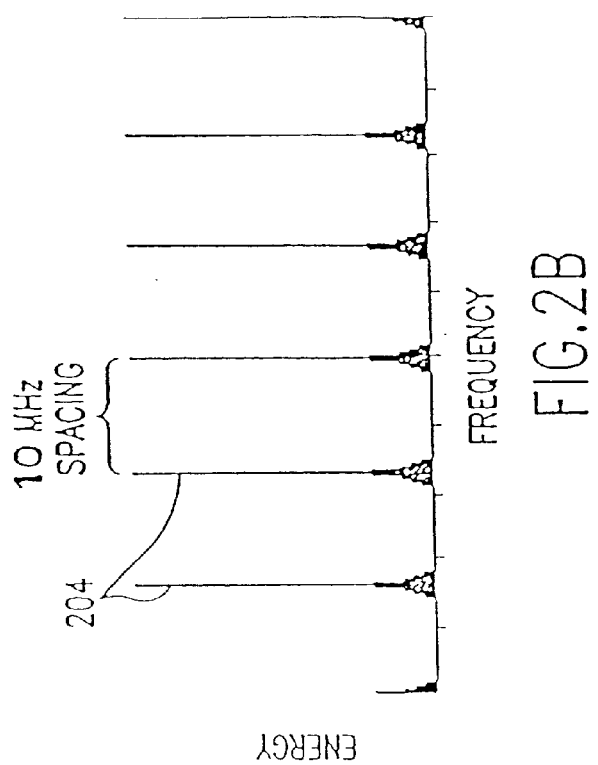
FIG. 2B illustrates the frequency domain amplitude of the waveform of FIG. 2A.
Figure 2A:
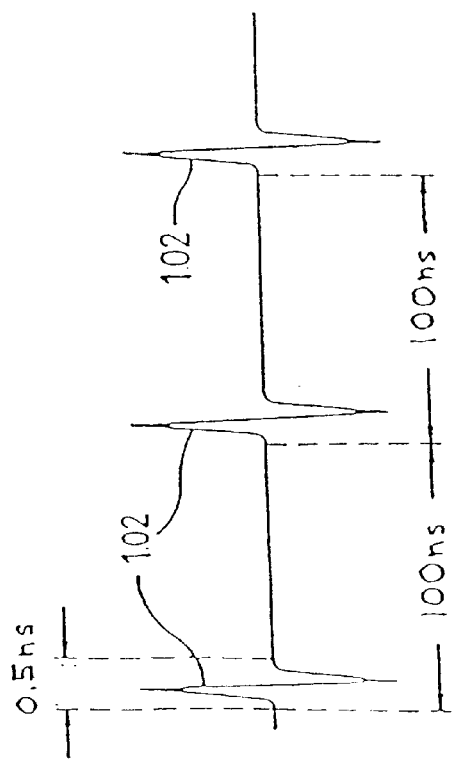
FIG. 2A illustrates a pulse train comprising pulses as in FIG. 1A.

Prototypes have been built which have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to a receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by non-uniformly positioning each pulse relative to its nominal position according to a code such as a pseudo random code.

Figure 3:
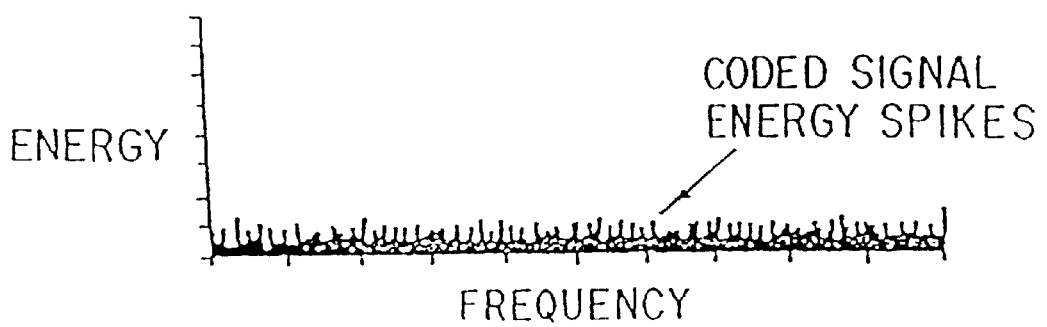
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining pseudo-random positioning for each pulse in a sequence of pulses). FIG. 3, when compared to FIG. 2B, shows that the impact of using a PN code is to destroy the comb line structure and spread the energy more uniformly. This structure typically has slight variations that are characteristic of the specific code used.

Coding also provides a method of establishing independent communication channels using impulse radio. Codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to code dither) in response to the information signal. This amount is typically very small relative to the code shift. In a 10 Mpps system with a center frequency of 2 GHz., for example, the code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The code helps impulse systems discriminate between the intended impulse transmission and interfering transmissions from others.

Figure 4:
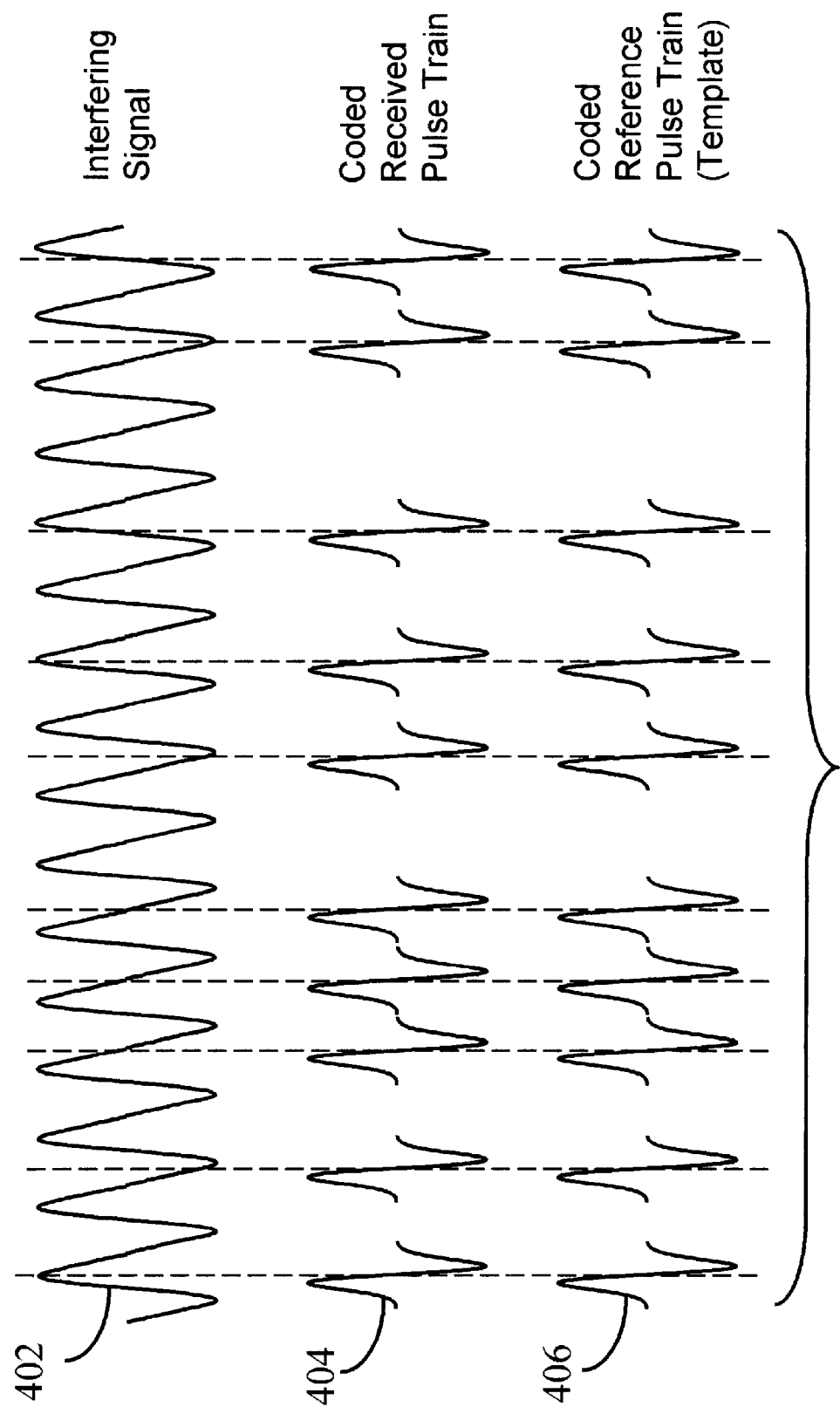
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a code dithered template signal 406. Without coding, the cross correlation would sample the interfering signal 402 with such regularity that the interfering signals could cause significant interference to the impulse radio receiver. However, when the transmitted impulse signal is encoded with the code dither (and the impulse radio receiver template signal 406 is synchronized with that identical code dither) the correlation samples the interfering signals non-uniformly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 KHz information bandwidth and a 10 MHz channel bandwidth yields a processing gain of 1000 or 30 dB. However, far greater processing gains are achieved by impulse radio systems, where the same 10 KHz information bandwidth is spread across a much greater 2 GHz channel bandwidth, resulting in a theoretical processing gain of 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades also gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight-line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5B:
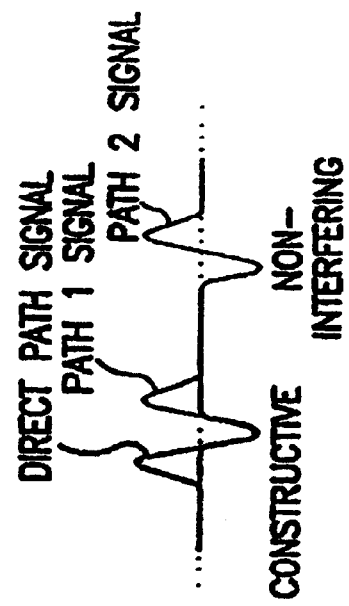
FIG. 5B illustrates exemplary multipath signals in the time domain.
Figure 5A:
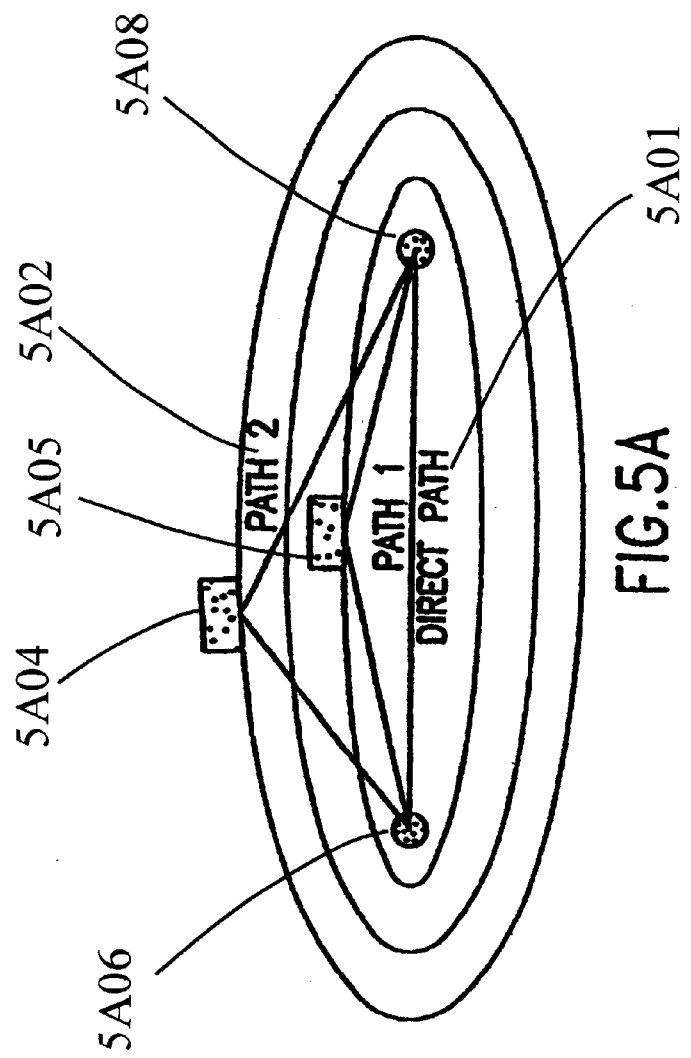
FIG. 5A illustrates a typical geometrical configuration giving rise to multipath received signals.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal that propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

Figure 5C:
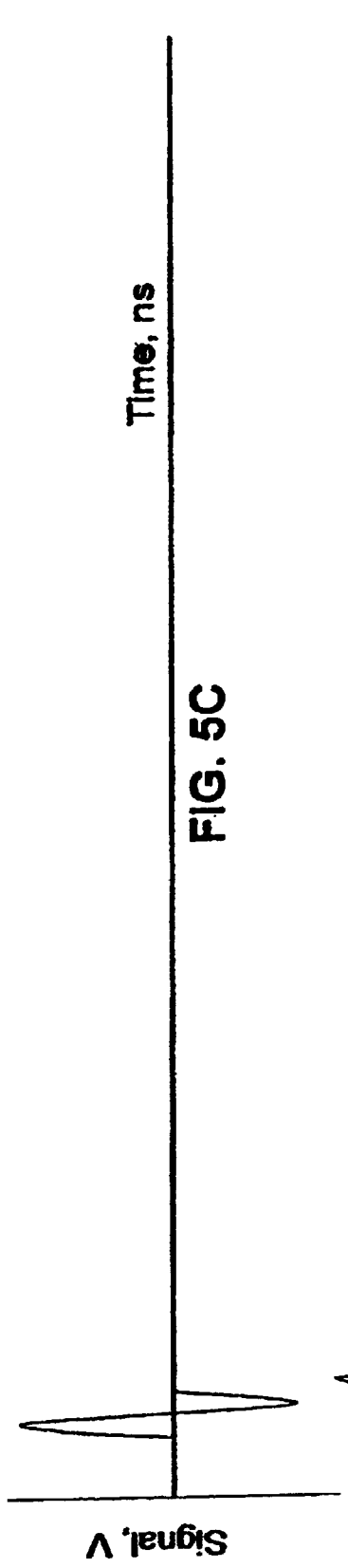
FIGS. 5C–5E illustrate a signal plot of various multipath environments.
Figure 5D:
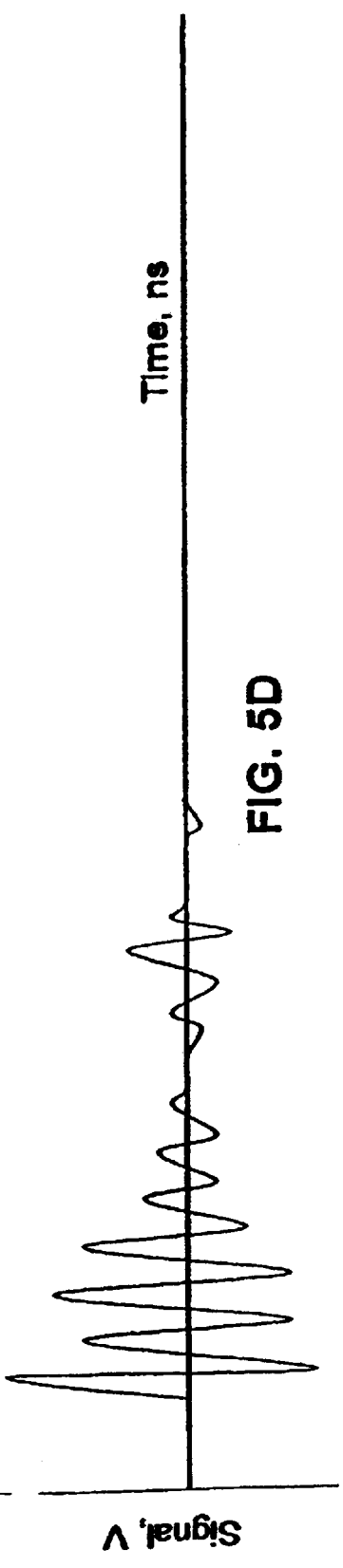
Figure 5E:
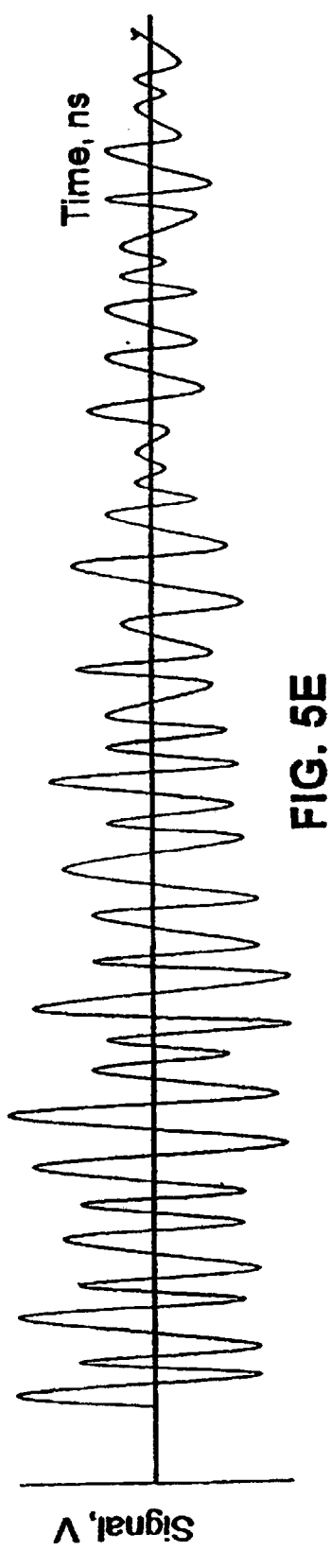

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. In this situation, the direct path signal power is small relative to the total signal power from the reflections.

An impulse radio receiver can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path-a highly unlikely scenario. This time separation of mulitipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{1}{\sigma^2} \exp\left(\frac{-r^2}{2\sigma^2}\right)$$

where
  r is the envelope amplitude of the combined multipath signals, and
  $2\sigma^2$ is the RMS power of the combined multipath signals.

Figure 5F:
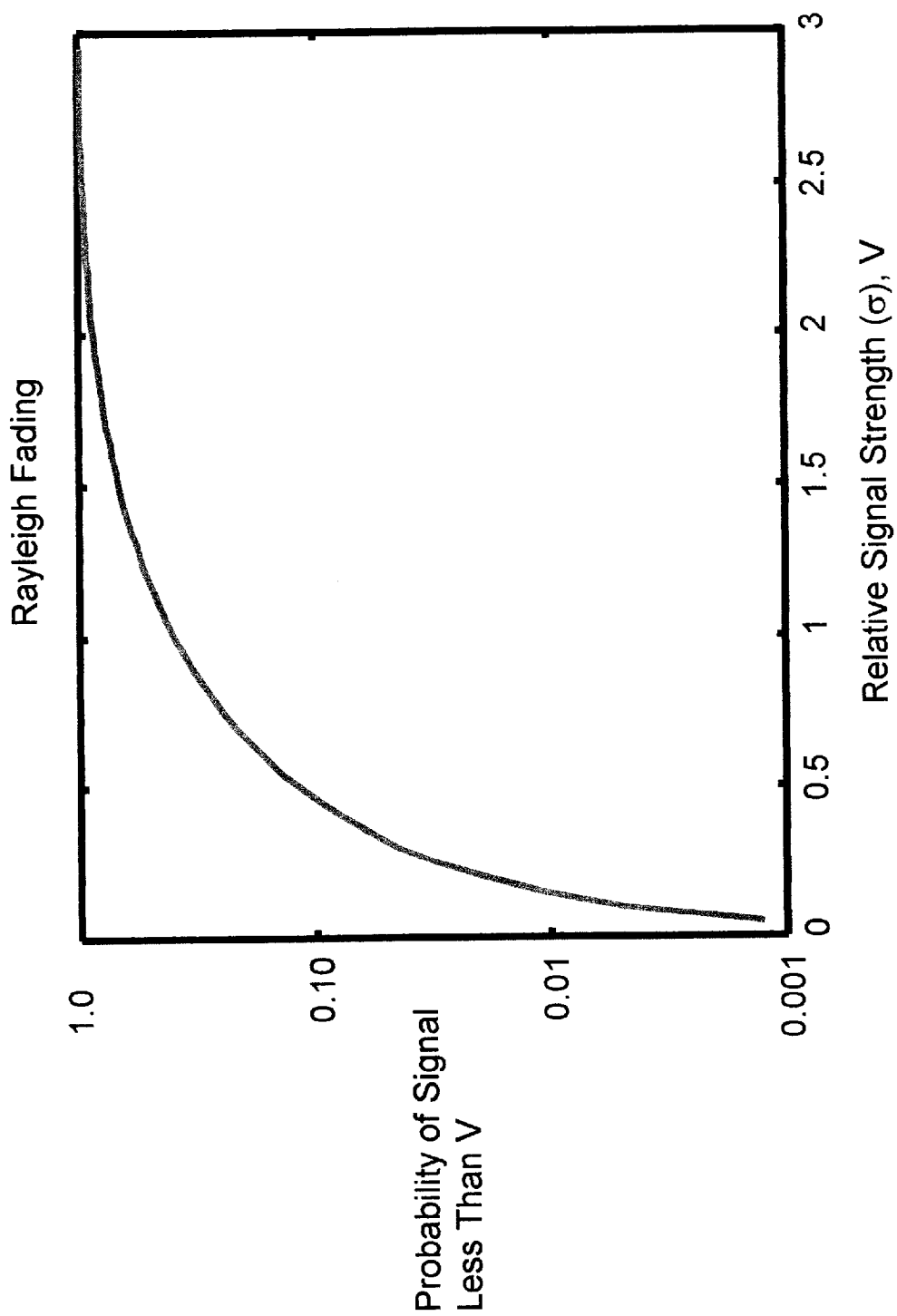
FIG. 5F illustrates the Rayleigh fading curve associated with non-impulse radio transmissions in a multipath environment.

This distribution is shown in FIG. 5F. It can be seen in FIG. 5F that 10% of the time, the signal is more than 16 dB attenuated. This suggests that 16 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
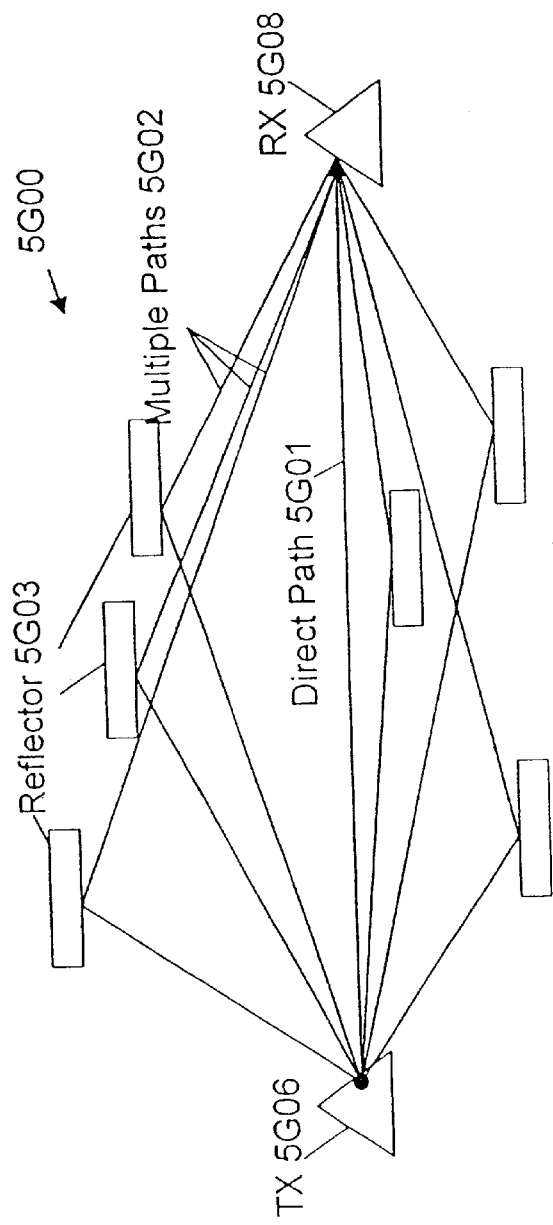
FIG. 5G illustrates a plurality of multipaths with a plurality of reflectors from a transmitter to a receiver.
Figure 5H:
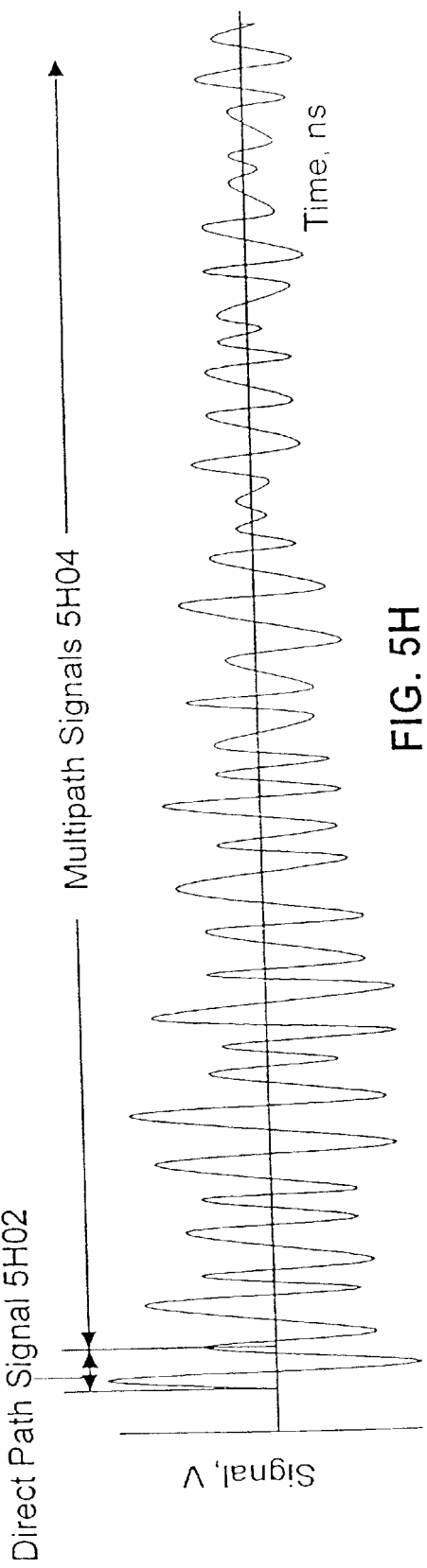
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02, with the vertical axis being the signal strength in volts and horizontal axis representing time in nanoseconds. Multipath signals are graphically illustrated at 5H04.

Distance Measurement

Important for positioning, impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allow positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending U.S. Pat. No. 6,133,876 titled "Ultrawide-Band Position Determination System and Method", and U.S. Pat. No. 6,111,536 titled "System and Method for Distance Measurement by Inphase and Quadrature Signals in a Radio System," both of which are incorporated herein by reference.

In addition to the methods articulated above, impulse radio technology along with Time Division Multiple Access algorithms and Time Domain packet radios can achieve geo-positioning capabilities in a radio network. This geo-positioning method allows ranging to occur within a network of radios without the necessity of a full duplex exchange among every pair of radios.

Exemplary Transceiver Implementation
Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618. The code source 612 comprises a storage device such as a random access memory (RAM), read only memory (ROM), or the like, for storing suitable codes and for outputting the PN codes as a code signal 614. Alternatively, maximum length shift registers or other computational means can be used to generate the codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This bandpass filtering will cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710 via a receiver transmission line, coupled to the receive antenna 704, and producing a baseband output 712.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 ideally comprises a multiplier followed by a short term integrator to sum the multiplier product over the pulse interval.

The output of the correlator 710 is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to determine an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
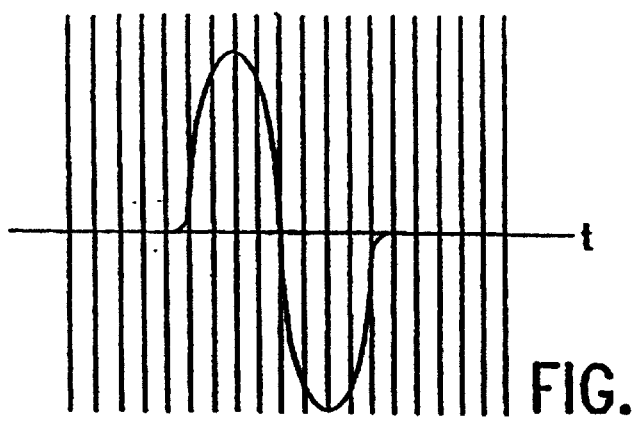
FIG. 8A illustrates a representative received pulse signal at the input to the correlator.
Figure 8B:
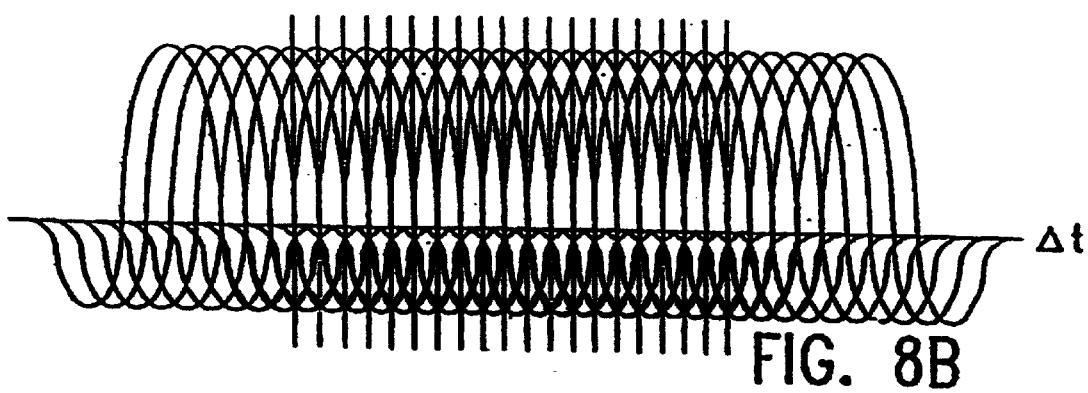
FIG. 8B illustrates a sequence of representative impulse signals in the correlation process.
Figure 8C:
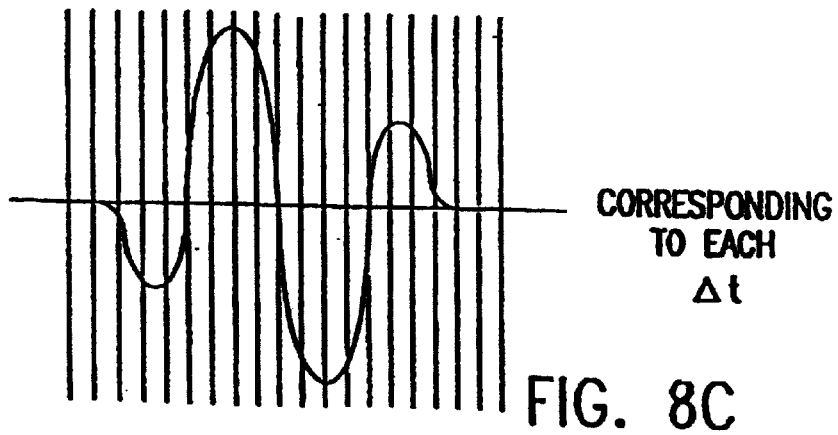
FIG. 8C illustrates the output of the correlator for each of the time offsets of FIG. 8B.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph does not show a waveform that is a function of time, but rather a function of time-offset. For any given pulse received, there is only one corresponding point that is applicable on this graph. This is the point corresponding to the time offset of the template signal used to receive that pulse. Further examples and details of precision timing can be found described in U.S. Pat. Nos. 5,677,927 and 6,304,623 both of which are incorporated herein by reference.

Recent Advances in Impulse Radio Communication Modulation Techniques

To improve the placement and modulation of pulses and to find new and improved ways that those pulses transmit information, various modulation techniques have been developed. The modulation techniques articulated above as well as the recent modulation techniques invented and summarized below are incorporated herein by reference.

FLIP Modulation

An impulse radio communications system can employ FLIP modulation techniques to transmit and receive flip modulated impulse radio signals. Further, it can transmit and receive flip with shift modulated (also referred to as quadrature flip time modulated (QFTM)) impulse radio signals. Thus, FLIP modulation techniques can be used to create two, four, or more different data states.

Flip modulators include an impulse radio receiver with a time base, a precision timing generator, a template generator, a delay, first and second correlators, a data detector and a time base adjustor. The time base produces a periodic timing signal that is used by the precision timing generator to produce a timing trigger signal. The template generator uses the timing trigger signal to produce a template signal. A delay receives the template signal and outputs a delayed template signal. When an impulse radio signal is received, the first correlator correlates the received impulse radio signal with the template signal to produce a first correlator output signal, and the second correlator correlates the received impulse radio signal with the delayed template signal to produce a second correlator output signal. The data detector produces a data signal based on at least the first correlator output signal. The time base adjustor produces a time base adjustment signal based on at least the second correlator output signal. The time base adjustment signal is used to synchronize the time base with the received impulse radio signal.

For greater elaboration of FLIP modulation techniques, the reader is directed to the patent application entitled, "Apparatus, System and Method for FLIP Modulation in an Impulse Radio Communication System", Ser. No. 09/537, 692, filed Mar. 29, 2000 and assigned to the assignee of the present invention. This patent application is incorporated herein by reference.

Vector Modulation

Vector Modulation is a modulation technique which includes the steps of generating and transmitting a series of time-modulated pulses, each pulse delayed by one of four pre-determined time delay periods and representative of at least two data bits of information, and receiving and demodulating the series of time-modulated pulses to estimate the data bits associated with each pulse. The apparatus includes an impulse radio transmitter and an impulse radio receiver.

The transmitter transmits the series of time-modulated pulses and includes a transmitter time base, a time delay modulator, a code time modulator, an output stage, and a transmitting antenna. The receiver receives and demodulates the series of time-modulated pulses using a receiver time base and two correlators, one correlator designed to operate after a pre-determined delay with respect to the other correlator. Each correlator includes an integrator and a comparator, and may also include an averaging circuit that calculates an average output for each correlator, as well as a track and hold circuit for holding the output of the integrators. The receiver further includes an adjustable time delay circuit that may be used to adjust the pre-determined delay between the correlators in order to improve detection of the series of time-modulated pulses.

For greater elaboration of Vector modulation techniques, the reader is directed to the patent application entitled, "Vector Modulation System and Method for Wideband Impulse Radio Communications", Ser. No. 09/169,765, filed Dec. 9, 1999 and assigned to the assignee of the present invention. This patent application is incorporated herein by reference.

Receivers

Because of the unique nature of impulse radio receivers several modifications have been recently made to enhance system capabilities.

Multiple Correlator Receivers

Multiple correlator receivers utilize multiple correlators that precisely measure the impulse response of a channel and wherein measurements can extend to the maximum communications range of a system, thus, not only capturing ultra-wideband propagation waveforms, but also information on data symbol statistics. Further, multiple correlators enable rake acquisition of pulses and thus faster acquisition, tracking implementations to maintain lock and enable various modulation schemes. Once a tracking correlator is synchronized and locked to an incoming signal, the scanning correlator can sample the received waveform at precise time delays relative to the tracking point. By successively increasing the time delay while sampling the waveform, a complete, time-calibrated picture of the waveform can be collected.

For greater elaboration of utilizing multiple correlator techniques, the reader is directed to the patent application entitled, "System and Method of using Multiple Correlator Receivers in an Impulse Radio System", Ser. No. 09/537, 264, filed Mar. 29, 2000 and assigned to the assignee of the present invention. This patent application is incorporated herein by reference.

Fast Locking Mechanisms

Methods to improve the speed at which a receiver can acquire and lock onto an incoming impulse radio signal have been developed. In one approach, a receiver comprises an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in detail in U.S. Pat. No. 5,832,035 to Fullerton, incorporated herein by reference.

In another approach, a receiver obtains a template pulse train and a received impulse radio signal. The receiver compares the template pulse train and the received impulse radio signal to obtain a comparison result. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, the reader is directed to the patent application entitled, "Method and System for Fast Acquisition of Ultra Wideband Signals", Ser. No. 09/538, 292, filed Mar. 29, 2000, now U.S. Pat. No. 6,556,621, and assigned to the assignee of the present invention. This patent application is incorporated herein by reference.

Baseband Signal Converters

A receiver has been developed which includes a baseband signal converter device and combines multiple converter circuits and an RF amplifier in a single integrated circuit package. Each converter circuit includes an integrator circuit that integrates a portion of each RF pulse during a sampling period triggered by a timing pulse generator. The integrator capacitor is isolated by a pair of Schottky diodes connected to a pair of load resistors. A current equalizer circuit equalizes the current flowing through the load resistors when the integrator is not sampling. Current steering logic transfers load current between the diodes and a constant bias circuit depending on whether a sampling pulse is present.

For greater elaboration of utilizing baseband signal converters, the reader is directed to U.S. Pat. No. 6,421,389 entitled, "Baseband Signal Converter for a Wideband Impulse Radio Receiver" and assigned to the assignee of the present invention. This patent is incorporated herein by reference.

Power Control and Interference

Power Control

Power control improvements have been invented with respect to impulse radios. The power control systems comprise a first transceiver that transmits an impulse radio signal to a second transceiver. A power control update is calculated according to a performance measurement of the signal received at the second transceiver. The transmitter power of either transceiver, depending on the particular embodiment, is adjusted according to the power control update. Various performance measurements are employed according to the current invention to calculate a power control update, including bit error rate, signal-to-noise ratio, and received signal strength, used alone or in combination. Interference is thereby reduced, which is particularly important where multiple impulse radios are operating in close proximity and their transmissions interfere with one another. Reducing the transmitter power of each radio to a level that produces satisfactory reception increases the total number of radios that can operate in an area without saturation. Reducing transmitter power also increases transceiver efficiency.

For greater elaboration of utilizing baseband signal converters, the reader is directed to the patent application entitled, "System and Method for Impulse Radio Power Control", Ser. No. 09/332,501, filed Jun. 14, 1999, now U.S. Pat. No. 6,539,213, and assigned to the assignee of the present invention. This patent application is incorporated herein by reference.

Mitigating Effects of Interference

To assist in mitigating interference to impulse radio systems a methodology has been invented. The method comprises the steps of: (a) conveying the message in packets; (b) repeating conveyance of selected packets to make up a repeat package; and (c) conveying the repeat package a plurality of times at a repeat period greater than twice the occurrence period of the interference. The communication may convey a message from a proximate transmitter to a distal receiver, and receive a message by a proximate receiver from a distal transmitter. In such a system, the method comprises the steps of: (a) providing interference indications by the distal receiver to the proximate transmitter; (b) using the interference indications to determine predicted noise periods; and (c) operating the proximate transmitter to convey the message according to at least one of the following: (1) avoiding conveying the message during noise periods; (2) conveying the message at a higher power during noise periods; (3) increasing error detection coding in the message during noise periods; (4) re-transmitting the message following noise periods; (5) avoiding conveying the message when interference is greater than a first strength; (6) conveying the message at a higher power when the interference is greater than a second strength; (7) increasing error detection coding in the message when the interference is greater than a third strength; and (8) re-transmitting a portion of the message after interference has subsided to less than a predetermined strength.

For greater elaboration of mitigating interference to impulse radio systems, the reader is directed to the patent application entitled, "Method for Mitigating Effects of Interference in Impulse Radio Communication", Ser. No. 09/587,033, filed Jun. 2, 1999 and assigned to the assignee of the present invention. This patent application is incorporated herein by reference.

Moderating Interference While Controlling Equipment

Yet another improvement to impulse radio includes moderating interference with impulse radio wireless control of an appliance; the control is affected by a controller remote from the appliance transmitting impulse radio digital control signals to the appliance. The control signals have a transmission power and a data rate. The method comprises the steps of: (a) in no particular order: (1) establishing a maximum acceptable noise value for a parameter relating to interfering signals; (2) establishing a frequency range for measuring the interfering signals; (b) measuring the parameter for the interference signals within the frequency range; and (c) when the parameter exceeds the maximum acceptable noise value, effecting an alteration of transmission of the control signals.

For greater elaboration of moderating interference while effecting impulse radio wireless control of equipment, the reader is directed to the patent application entitled, "Method and Apparatus for Moderating Interference While Effecting Impulse Radio Wireless Control of Equipment", Ser. No. 09/586,163, filed Jun. 2, 2000, now U.S. Pat. No. 6,571,089, and assigned to the assignee of the present invention. This patent application is incorporated herein by reference.

Coding Advances

The improvements made in coding can directly improve the characteristics of impulse radio as used in the present invention. Specialized coding techniques may be employed to establish temporal and/or non-temporal pulse characteristics such that a pulse train will possess desirable properties. Coding methods for specifying temporal and non-temporal pulse characteristics are described in commonly owned, co-pending applications entitled "A Method and Apparatus for Positioning Pulses in Time", Ser. No. 09/592,249, and "A Method for Specifying Non-Temporal Pulse Characteristics", Ser. No. 09/592,250, both filed Jun. 12, 2000, and both of which are incorporated herein by reference. Essentially, a temporal or non-temporal pulse characteristic value layout is defined, an approach for mapping a code to the layout is specified, a code is generated using a numerical code generation technique, and the code is mapped to the defined layout per the specified mapping approach.

A temporal or non-temporal pulse characteristic value layout may be fixed or non-fixed and may involve value ranges, discrete values, or a combination of value ranges and discrete values. A value range layout specifies a range of values for a pulse characteristic that is divided into components that are each subdivided into subcomponents, which can be further subdivided, ad infinitum. In contrast, a discrete value layout involves uniformly or non-uniformly distributed discrete pulse characteristic values. A non-fixed layout (also referred to as a delta layout) involves delta values relative to some reference value such as the characteristic value of the preceding pulse. Fixed and non-fixed layouts, and approaches for mapping code element values to them, are described in co-owned, co-pending applications, entitled "Method for Specifying Pulse Characteristics using Codes", Ser. No. 09/592,290 and "A Method and Apparatus for Mapping Pulses to a Non-Fixed Layout", Ser. No. 09/591,691, both filed on Jun. 12, 2000 and both of which are incorporated herein by reference.

A fixed or non-fixed characteristic value layout may include one or more non-allowable regions within which a characteristic value of a pulse is not allowed. A method for specifying non-allowable regions to prevent code elements from mapping to non-allowed characteristic values is described in co-owned, co-pending application entitled "A Method for Specifying Non-Allowable Pulse Characteristics", Ser. No. 09/592,289, filed Jun. 12, 2000 and incorporated herein by reference. A related method that conditionally positions pulses depending on whether or not code elements map to non-allowable regions is described in co-owned, co-pending application, entitled "A Method and Apparatus for Positioning Pulses Using a Layout having Non-Allowable Regions", Ser. No. 09/592,248 and incorporated herein by reference, filed Jun. 12, 2000.

Typically, a code consists of a number of code elements having integer or floating-point values. A code element value may specify a single pulse characteristic (e.g., pulse position in time) or may be subdivided into multiple components, each specifying a different pulse characteristic. For example, a code having seven code elements each subdivided into five components (c0–c4) could specify five different characteristics of seven pulses. A method for subdividing code elements into components is described in commonly owned, co-pending application entitled "Method for Specifying Pulse Characteristics using Codes", Ser. No. 09/592,290, filed Jun. 12, 2000 previously referenced and again incorporated herein by reference. Essentially, the value of each code element or code element component (if subdivided) maps to a value range or discrete value within the defined characteristic value layout. If a value range layout is used an offset value is typically employed to specify an exact value within the value range mapped to by the code element or code element component.

The signal of a coded pulse train can be generally expressed:

$$s_{tr}^{(k)}(t) = \sum_{j} (-1)^{f_j^{(k)}} a_j^{(k)} \omega(c_j^{(k)} t - T_j^{(k)}, b_j^{(k)})$$

where k is the index of a transmitter, j is the index of a pulse within its pulse train, $(-1)f_j^{(k)}$, $a_j^{(k)}$, $c_j^{(k)}$, and $b_j^{(k)}$ are the coded polarity, amplitude, width, and waveform of the jth pulse of the kth transmitter, and $T_j^{(k)}$ is the coded time shift of the jth pulse of the kth transmitter. Note: When a given non-temporal characteristic does not vary (i.e., remains constant for all pulses in the pulse train), the corresponding code element component is removed from the above expression and the non-temporal characteristic value becomes a constant in front of the summation sign.

Various numerical code generation methods can be employed to produce codes having certain correlation and spectral properties. Such codes typically fall into one of two categories: designed codes and pseudorandom codes.

A designed code may be generated using a quadratic congruential, hyperbolic congruential, linear congruential, Costas array or other such numerical code generation technique designed to generate codes guaranteed to have certain correlation properties. Each of these alternative code generation techniques has certain characteristics to be considered in relation to the application of the pulse transmission system employing the code. For example, Costas codes have nearly ideal autocorrelation properties but somewhat less than ideal cross-correlation properties, while linear congruential codes have nearly ideal cross-correlation properties but less than ideal autocorrelation properties. In some cases, design tradeoffs may require that a compromise between two or more code generation techniques be made such that a code is generated using a combination of two or more techniques. An example of such a compromise is an extended quadratic congruential code generation approach that uses two 'independent' operators, where the first operator is linear and the second operator is quadratic. Accordingly, one, two, or more code generation techniques or combinations of such techniques can be employed to generate a code without departing from the scope of the invention.

A pseudorandom code may be generated using a computer's random number generator, binary shift-register(s) mapped to binary words, a chaotic code generation scheme, or another well-known technique. Such 'random-like' codes are attractive for certain applications since they tend to spread spectral energy over multiple frequencies while having 'good enough' correlation properties, whereas designed codes may have superior correlation properties but have spectral properties that may not be as suitable for a given application.

Computer random number generator functions commonly employ the linear congruential generation (LCG) method or the Additive Lagged-Fibonacci Generator (ALFG) method. Alternative methods include inversive congruential generators, explicit-inversive congruential generators, multiple recursive generators, combined LCGs, chaotic code generators, and Optimal Golomb Ruler (OGR) code generators. Any of these or other similar methods can be used to generate a pseudorandom code without departing from the scope of the invention, as will be apparent to those skilled in the relevant art.

Detailed descriptions of code generation and mapping techniques are included in a co-owned patent application Ser. No. 09/592,218 filed on Jun. 12, 2000 and entitled "A Method and Apparatus for Positioning Pulses in Time", which is hereby incorporated by reference.

It may be necessary to apply predefined criteria to determine whether a generated code, code family, or a subset of a code is acceptable for use with a given UWB application. Criteria to consider may include correlation properties, spectral properties, code length, non-allowable regions, number of code family members, or other pulse characteristics. A method for applying predefined criteria to codes is described in co-owned, co-pending application, entitled "A Method and Apparatus for Specifying Pulse Characteristics using a Code that Satisfies Predefined Criteria", Ser. No. 09/592,288, filed Jun. 12, 2000 and is incorporated herein by reference.

In some applications, it may be desirable to employ a combination of two or more codes. Codes may be combined sequentially, nested, or sequentially nested, and code combinations may be repeated. Sequential code combinations typically involve transitioning from one code to the next after the occurrence of some event. For example, a code with properties beneficial to signal acquisition might be employed until a signal is acquired, at which time a different code with more ideal channelization properties might be used. Sequential code combinations may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in desirable spectral properties. A method for applying code combinations is described in co-owned, co-pending application, entitled "A Method and Apparatus for Applying Codes Having Pre-Defined Properties", Ser. No. 09/591,690, filed Jun. 12, 2000 which is incorporated herein by reference.

PREFERRED EMBODIMENT OF THE PRESENT INVENTION

Referring to FIGS. 9–23, there are disclosed in accordance with the present invention an exemplary network 900, an exemplary sensor 902 and a preferred method 1100 capable of using impulse radio technology to help monitor and/or control the environment within a building.

Although the present invention is described as using impulse radio technology, it should be understood that the present invention can be used with any type of ultra wideband technology, but is especially suited for use with time-modulated ultra wideband technology. Accordingly, the network 900, the sensor 902 and the method 1100 should not be construed in a limited manner.

Figure 9:
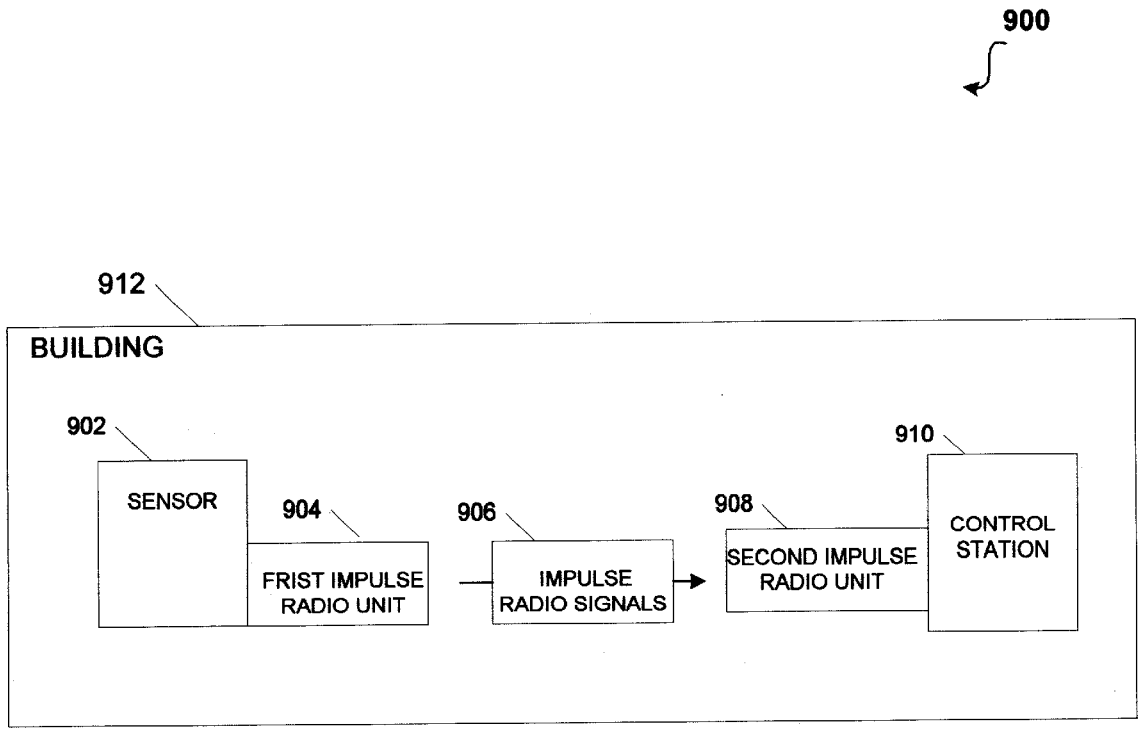
FIG. 9 is a diagram illustrating the basic components of a network in accordance with the present invention.

Referring to FIG. 9, there is a diagram illustrating the basic components of the system 900 in accordance with the present invention. Generally, the network 900 includes a sensor 902 (only one shown) attached to a first impulse radio unit 904 (similar to the impulse radio transmitter 602 of FIG. 6) that is capable of transmitting an impulse radio signal 906 containing sensor related information to a second impulse radio unit 908 (similar to the impulse radio receiver 702 of FIG. 7). The second impulse radio unit 908 may be attached to a control station 910 that uses the sensor related information (e.g., environmental related information, safety related information, surveillance related information) to monitor and/or control the environment outside or within a building 912 (e.g., home, office, factory). As will be described in greater detail below, different configurations of the network 900 and sensor 902 can utilize the revolutionary and highly scalable communication capabilities, position capabilities (optional) and radar capabilities (optional) of impulse radio technology to effectively control and/or monitor the environment outside or within the building 912.

Figure 10:
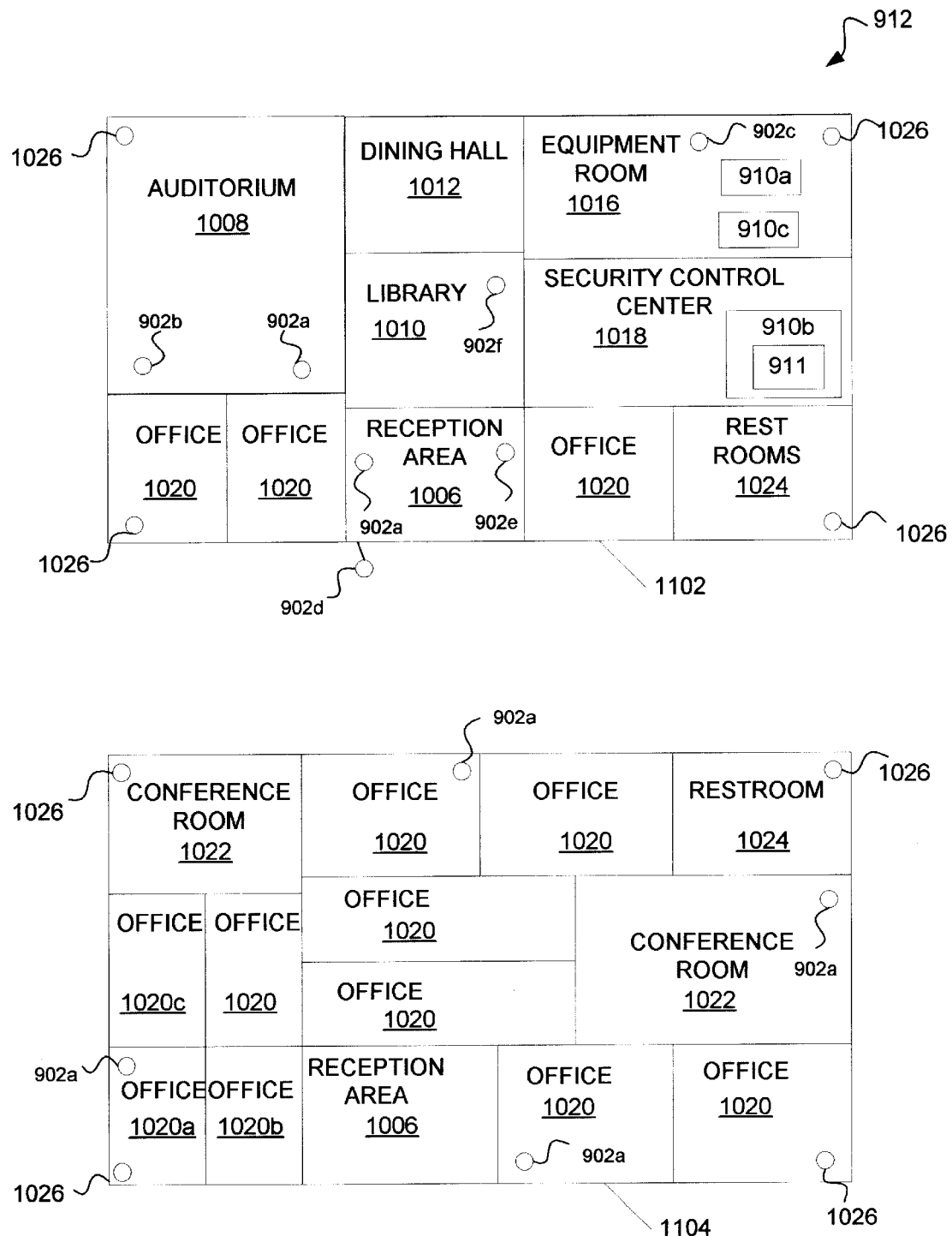
FIG. 10 is a diagram illustrating the network of FIG. 9 incorporated within and outside a building.

Referring to FIG. 10, there is a diagram illustrating an exemplary layout of a building 912 incorporating the network 900 and different types of sensors 902. As illustrated, the building 912 (shown as an office) includes a first floor 1002 and a second floor 1004. The first floor 1104 can include a reception area 1006, auditorium 1008, library 1010, dining hall 1012, restrooms 1014, equipment room 1016, security control center 1018 and offices 1020. The second floor 1004 can includes a series of offices 1020, conference rooms 1022 and restrooms 1024. Of course, the illustrated layout of the building 912 is for purposes of discussion only and is not intended as a limitation to the present invention.

The sensors 902 can have many functions and can use many different techniques to obtain sensor related information which is eventually modulated and forwarded in the impulse radio signals 906 towards the control station 910 (see FIG. 9). For instance, the sensor 902 can take the form of a thermostat 902a (only six shown) which can be used to monitor and control the temperature in a particular area of the building 912. In this case, the sensor 902a and the first impulse radio unit 904 (configured as a transmitting impulse radio unit 602) would operate together to transmit an impulse radio signal 906 having a known pseudorandom sequence of pulses that look like a series of Gaussian waveforms (see FIGS. 1–3) that contain environmental related information towards the second impulse radio unit 908 attached to a control station 910a. The control station 910a can use the received environmental related information (e.g., temperature readings) to control the heating and cooling equipment. As described below, the sensor 902 (e.g., thermostat, smoke detector, surveillance camera, motion detector) of the present invention can monitor and transmit within impulse radio signals 906 different types of sensor related information including, for example, environmental related information, safety related information and surveillance related information.

In regards to safety related information, the sensor 902 can take the form of a smoke detector 902b, a gas detector 902c (e.g., carbon monoxide detector) or any other sensor that can detect a dangerous situation within the building 912. For instance, the smoke detector 902b and the first impulse radio unit 904 (configured as a transmitting impulse radio unit 602) would operate together to transmit an impulse radio signal 906 having a known pseudorandom sequence of pulses that look like a series of Gaussian waveforms (see FIGS. 1–3) that contain safety related information towards the second impulse radio unit 908 attached to a control station 910b. The control station 910b can be located in the security control center 1018 and include a display 911 containing an overlay showing the positions of various sensors 902 throughout the building 912. Alternatively, the control station 910b can be configured as a control panel attached to the alarm, sprinkler or fire extinguishing equipment (not shown).

In regards to surveillance related information, the sensor 902 can take the form of a surveillance camera 902d, a motion detector 902e or any other sensor that can monitor an area outside or within the building 912. For instance, the surveillance camera 902d and the first impulse radio unit 904 (configured as a transmitting impulse radio unit 602) would operate together to transmit impulse radio signals 906 having a known pseudorandom sequence of pulses that look like a series of Gaussian waveforms (see FIGS. 1–3) that contain surveillance related information to the second impulse radio unit 908 attached to the control station 910b. The control station 910b can be located in the security control center 1018 and include a display 911 containing an overlay showing the video taken by the surveillance camera 902d. In addition, the first impulse radio unit 902 could include a receiving impulse radio unit 702 capable of receiving impulse radio signals 902 from the second impulse radio unit 908 that control the focus and movement of the surveillance camera 902d.

The motion detector 902e can use the radar capabilities of impulse radio technology to detect the presence of a person (e.g., intruder) and transmit this surveillance related information in impulse radio signals 906 to the control station 910b. In another application, the motion detector 902e can be used to turn-on and turn-off lights within the building 912 or certain rooms in the building 912. For instance, the motion detector 902e can detect when a person enters a restroom and then communicate that information to the control station 910 which then automatically turns-on the lights within the restroom.

In regards to environmental related information, the sensor 902 can take the form of a thermostat 902a, a humidity detector 902f, a dust detector 902g or any other sensor that can monitor an environmental condition within the building 912. For instance, the humidity detector 902f and the first impulse radio unit 904 (configured as a transmitting impulse radio unit 602) would operate together to transmit impulse radio signals 906 having a known pseudorandom sequence of pulses that look like a series of Gaussian waveforms (see FIGS. 1–3) that contain environmental related information to the second impulse radio unit 908 attached to a control station 910c. The control station 910c attached to the dehumidifier/humidifier equipment can use the received environmental related information (e.g., humidity readings) to control the humidity within the building 912.

As described above, the sensors 902 can monitor a variety of conditions within the building 912 and modulate and forward the information using impulse radio signals 915 to the control station 910. In fact, the control station 910 can be programmed to sound an alarm for building personnel whenever a monitored condition falls outside a predetermined range of acceptable conditions. In addition, the control station 910 can cause the sensor 902 (e.g., smoke detectors 902b) to sound an alarm whenever a monitored condition falls outside a predetermined range of acceptable conditions. The capability for the control station 910 to transmit control signals to the sensor 902 means that the sensor 902 includes a receiving impulse radio unit 702 and the control station 910 includes a transmitting impulse radio unit 602.

Again, conventional radio technology used to transmit and receive standard radio signals within a building suffers from the adverse affects of "dead zones" and "multipath interference". The "dead zones" in a building make it difficult for a sensor attached to standard radio transmitter to maintain contact with a standard radio receiver attached to a controller. In particular, the standard radio signals sent from the standard radio transmitter attached to the sensor may not be able to penetrate a certain wall or floor within the building and as such may not reach the standard radio receiver associated with the controller. This is especially true if the sensor can be moved to different locations within the building. Fortunately in the present invention, the impulse radio signals 906 transmitted from the sensor 902 to the control station 910 are located very close to DC which makes the attenuation due to walls and floors minimal compared to standard radio signals.

In addition, "multipath interference" which is very problematic within the closed structure of a building can be caused by the interference of a standard radio signal that has reached a standard radio receiver by two or more paths. Essentially, the standard radio receiver may not be able to demodulate the standard radio signal because the transmitted radio signal effectively cancels itself out by bouncing of walls and floors of the building before reaching the standard radio receiver. The present invention is not affected by "multipath interference" because the impulses of the impulse radio signal 906 arriving from delayed multipath reflections typically arrive outside a correlation (or demodulation) period of the second impulse radio unit 908.

The positioning capabilities of impulse radio technology also enable the positions of the sensors 902 to be determined and monitored by the control station 910. For instance, this capability can enable a person to carry one of the thermostats 902a into their office 1020a and control the temperature within their particular office 1020a regardless of the temperature within the adjoining offices 1020b and 1020c.

To enable the positions of sensors 902 to be tracked the network 900 includes a series of reference impulse radio units 1026 (only 8 shown). The reference impulse radio units 1026 have known positions and are located to provide maximum coverage throughout the building. The central station 910 typically has a wireless connection or hardwire connection to the reference impulse radio units 1026, and the sensors 902 typically have a wireless connection to the reference impulse radio units. Again, each sensor 902 is capable of interacting with one or more of the reference impulse radio units 1026 such that either the sensor 902, the central station 910, or one of the reference impulse radio units 1026 is able to triangulate and calculate the current position of a sensor 902. A variety of impulse radio positioning networks that enable the present invention to perform the positioning and tracking functions are described in greater detail below with respect to FIGS. 12–23.

For instance, the positioning and tracking functions can be accomplished by stepping through several steps. The first step is for the reference impulse radio units 1026 to synchronize together and begin passing information. Then, when a sensor 902 (e.g., thermostat 902a) enters a network area (e.g., second floor 1004), it synchronizes itself to the previously synchronized reference impulse radio units 1026. Once the sensor 902 is synchronized, it begins collecting and time-tagging range measurements from any available reference impulse radio units 1026. The sensor 902 then takes these time-tagged ranges and, using a least squares-based or similar estimator, calculates its position within the network area (e.g., office 1022a). Finally, the sensor 902 forwards its position calculation to the control station 910. Alternatively, one of the reference impulse radio units 1026 can calculate the position of the sensor 902. Moreover, the control station 910 can be programmed to track only the sensors 902 that the building personnel want to watch at one time.

Another use for the present invention is that safety, maintenance or rescue personnel (not shown) can carry a sensor 902 and communicate using impulse radio technology with building personnel using the control station 910. For instance, if a maintenance man needs assistance, an alert could be generated and immediately dispatched to other building personnel who can ascertain the location of the maintenance man and come to their aid.

Figure 11:
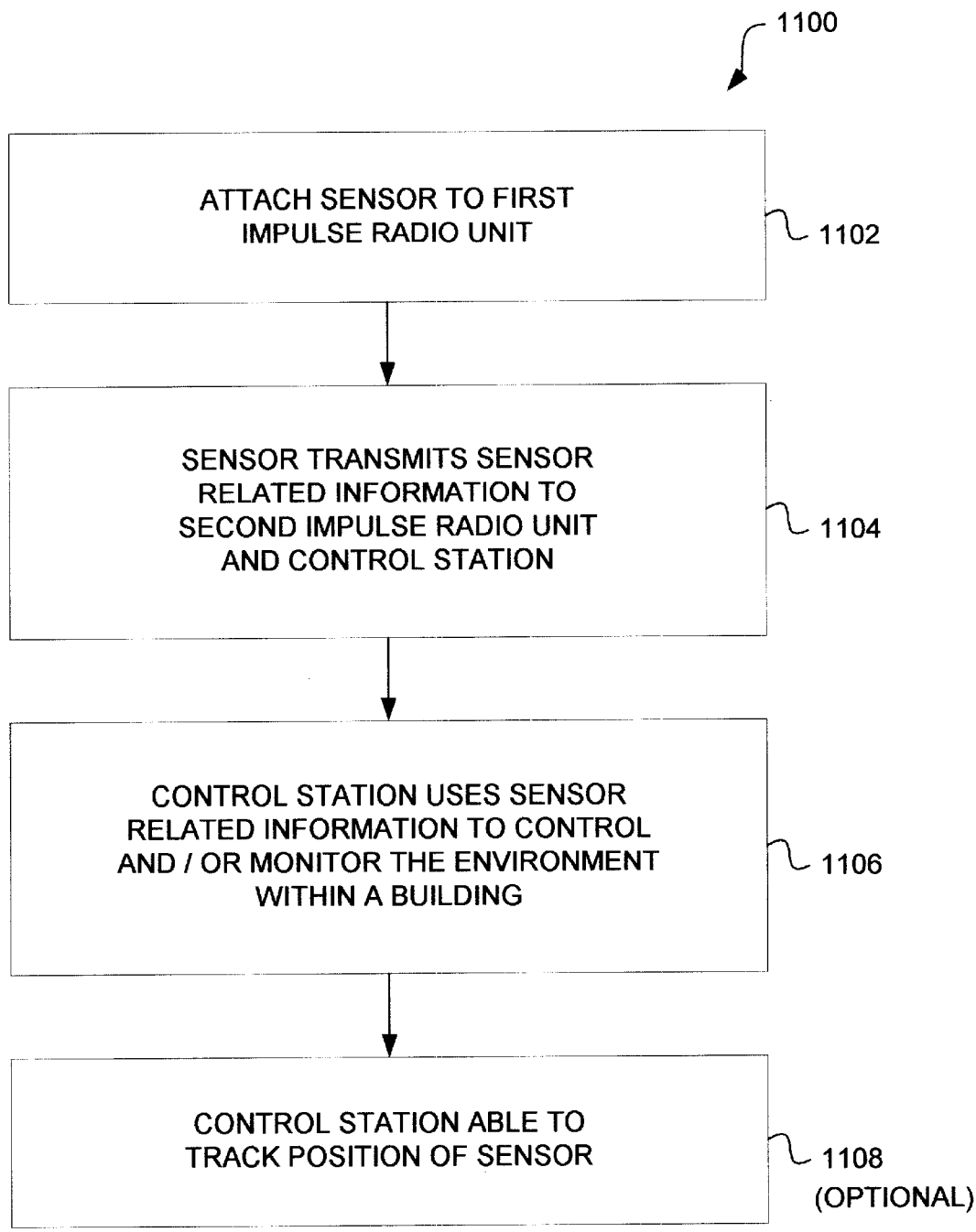
FIG. 11 is a flowchart illustrating the basic steps of a preferred method for monitoring and controlling the environment within and outside a building in accordance with the present invention.

Referring to FIG. 11, there is illustrated a flowchart of the basic steps of a preferred method 1100 for monitoring and/or controlling the environment within a building 912 in accordance with the present invention. Beginning at step 1102, the sensor 902 is attached to the first impulse radio unit 904 which can include an impulse radio transmitter 602 and possibly an impulse radio receiver 702. Typically, the sensor 904 and the first impulse radio unit 904 would be integral components.

At step 1104, the sensor 902 and first impulse radio unit 904 would operate together to transmit impulse radio signals 906 that contain sensor related information to a second impulse radio unit 908. The second impulse radio unit 908 is attached or incorporated within a control station 910 that can take many different forms depending on the particular types of sensors 902 with which it interacts as described above with respect to FIG. 10. The control station 910 at step 1106 can then use the sensor related information to monitor and control the environment within and outside the building 912. Again, the sensor related information can include a wide variety of information including, for example, environmental related information, safety related information and surveillance related information.

At step 1108 (optional), the network 200 can use reference impulse radio units 1026 and impulse radio technology to determine and track the position of each sensor 902. The capability to use impulse radio technology to communicate sensor related information and at the same time track the position of a sensor 902 within a building 912 is not possible with current radio technology. For instance, a person can carry a thermostat 902a into their office 1020a and control the temperature within their particular office 1020a regardless of the temperature within the adjoining offices 1020b and 1020c.

Impulse Radio Positioning Networks

A variety of impulse radio positioning networks capable of performing the positioning and tracking functions of the present invention are described in this Section (see also U.S. patent application Ser. No. 09/456,409), filed Dec. 8, 1999, now U.S. Pat. No. 6,300,903. An impulse radio positioning network includes a set of reference impulse radio units 1026 (shown below as reference impulse radio units R1–R6), one or more sensors 902 (shown below as sensors S1–S3 which include impulse radio units that can receive and/or transmit impulse radio signals) and a control station 910.

Synchronized Transceiver Tracking Architecture

Figure 12:
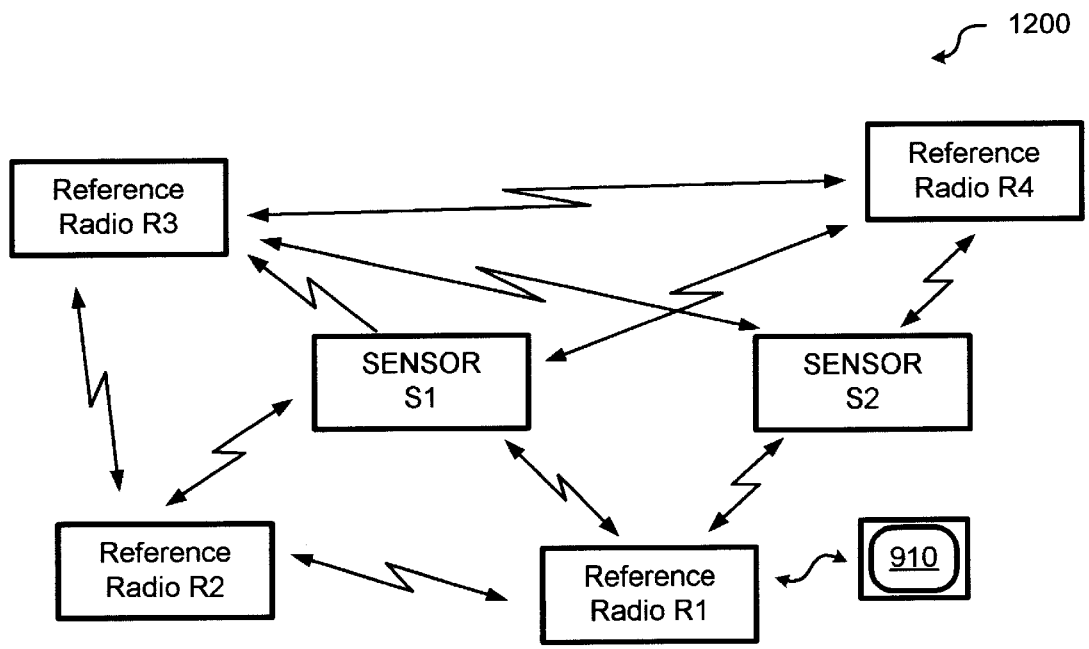
FIG. 12 is a block diagram of an impulse radio positioning network utilizing a synchronized transceiver tracking architecture that can be used in the present invention.

Referring to FIG. 12, there is illustrated a block diagram of an impulse radio positioning network 1200 utilizing a synchronized transceiver tracking architecture. This architecture is perhaps the most generic of the impulse radio positioning networks since both sensors S1 and S2 and reference impulse radio units R1–R4 are full two-way transceivers. The network 1200 is designed to be scalable, allowing from very few sensors S1 and S2 and reference impulse radio units R1–R4 to a very large number. This particular example of the synchronized transceiver tracking architecture shows a network 1200 of four reference impulse radio units R1–R4 and two sensors S1 and S2. The arrows between the radios represent two-way data and/or information links. A fully inter-connected network would have every radio continually communicating with every other radio, but this is not required and can be dependent upon the needs of the particular application.

Each radio is a two-way transceiver; thus each link between radios is two-way (duplex). Precise ranging information (the distance between two radios) is distributed around the network 1200 in such a way as to allow the sensors S1 and S2 to determine their precise three-dimensional position within a local coordinate system. This position, along with other data or information traffic, can then be relayed from the sensors S1 and S2 back to the reference master impulse radio unit R1, one of the other reference relay impulse radio units R2–R4 or the control station 910.

The radios used in this architecture are impulse radio two-way transceivers. The hardware of the reference impulse radio units R1–R4 and sensors S1 and S2 is essentially the same. The firmware, however, varies slightly based on the functions each radio must perform. For example, the reference master impulse radio unit R1 directs the passing of information and is typically responsible for collecting all the data for external graphical display at the control station 910. The remaining reference relay impulse radio units R2–R4 contain a separate version of the firmware, the primary difference being the different parameters or information that each reference relay impulse radio unit R2–R4 must provide the network. Finally, the sensors S1 and S2 have their own firmware version that calculates their position.

In FIG. 12, each radio link is a two-way link that allows for the passing of information, both data and/or information. The data-rates between each radio link is a function of several variables including the number of pulses integrated to get a single bit, the number of bits per data parameter, the length of any headers required in the messages, the range bin size, and the number of radios in the network.

By transmitting in assigned time slots and by carefully listening to the other radios transmit in their assigned transmit time slots, the entire group of radios within the network, both sensors S1 and S2 and reference impulse radio units R1–R4, are able to synchronize themselves. The oscillators used on the impulse radio boards drift slowly in time, thus they may require continual monitoring and adjustment of synchronization. The accuracy of this synchronization process (timing) is dependent upon several factors including, for example, how often and how long each radio transmits.

The purpose of this impulse radio positioning network 1200 is to enable the tracking of the sensors S1 and S2. Tracking is accomplished by stepping through several well-defined steps. The first step is for the reference impulse radio units R1–R4 to synchronize together and begin passing information. Then, when a sensor S1 or S2 enters the network area, it synchronizes itself to the previously synchronized reference impulse radio units R1–R4. Once the sensor S1 or S2 is synchronized, it begins collecting and time-tagging range measurements from any available reference impulse radio units R1–R4 (or other sensor S1 or S2). The sensor S1 or S2 then takes these time-tagged ranges and, using a least squares-based or similar estimator, calculates the position of the sensor S1 or S2 in local coordinates. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Finally, the sensor S1 or S2 forwards its position calculation to the control station 910 for storage and real-time display.

Unsynchronized Transceiver Tracking Architecture

Figure 13:
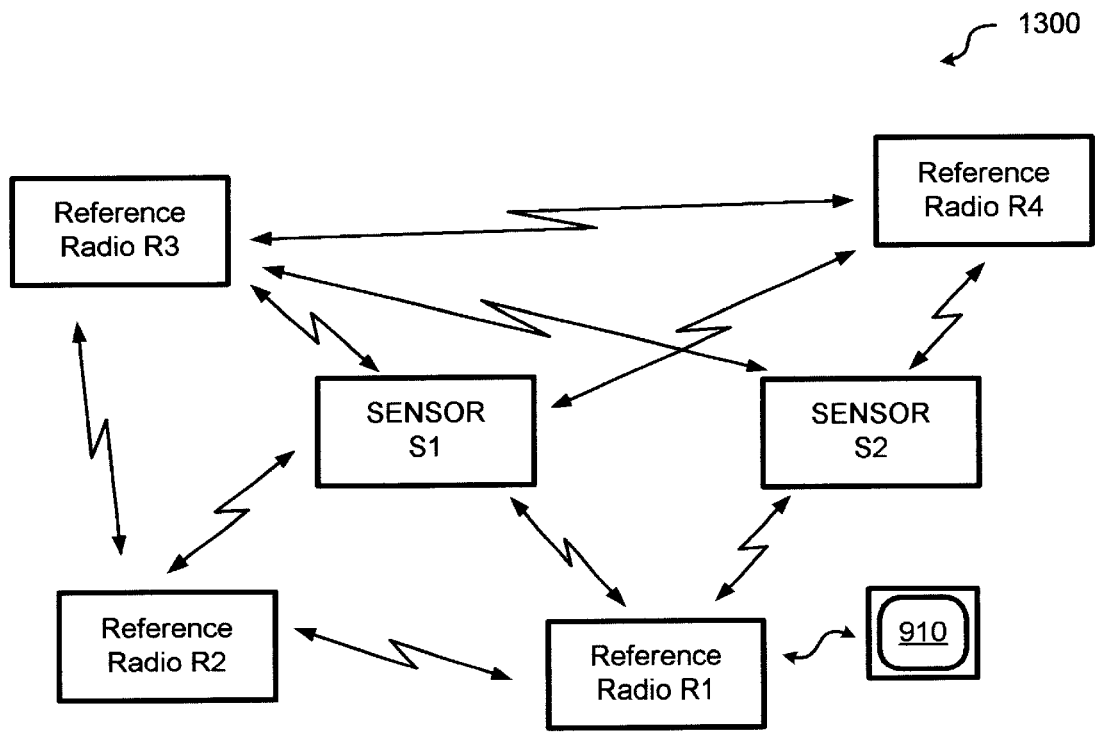
FIG. 13 is a block diagram of an impulse radio positioning network utilizing an unsynchronized transceiver tracking architecture that can be used in the present invention.

Referring to FIG. 13, there is illustrated a block diagram of an impulse radio positioning network 1300 utilizing an unsynchronized transceiver tracking architecture. This architecture is similar to synchronized transceiver tracking of FIG. 12, except that the reference impulse radio units R1–R4 are not time-synchronized. Both the sensors S1 and S2 and reference impulse radio units R1–R4 for this architecture are full two-way transceivers. The network is designed to be scalable, allowing from very few sensors S1 and S2 and reference impulse radio units R1–R4 and to a very large number.

This particular example of the unsynchronized transceiver tracking architecture shows a network 1300 of four reference impulse radio units R1–R4 and two sensors S1 and S2. The arrows between the radios represent two-way data and/or information links. A fully inter-connected network would have every radio continually communicating with every other radio, but this is not required and can be defined as to the needs of the particular application.

Each radio is a two-way transceiver; thus each link between radios is two-way (duplex). Precise ranging information (the distance between two radios) is distributed around the network in such a way as to allow the sensors S1 and S2 to determine their precise three-dimensional position within a local coordinate system. This position, along with other data or information traffic, can then be relayed from the sensors S1 and S2 back to the reference master impulse radio unit R1, one of the other reference relay impulse radio units R2–R3 or the control station 910.

The radios used in the architecture of FIG. 13 are impulse radio two-way transceivers. The hardware of the reference impulse radio units R1–R4 and sensors S1 and S2 is essentially the same. The firmware, however, varies slightly based on the functions each radio must perform. For example, the reference master impulse radio unit R1 directs the passing of information, and typically is responsible for collecting all the data for external graphical display at the control station 910. The remaining reference relay impulse radio units R2–R4 contain a separate version of the firmware, the primary difference being the different parameters or information that each reference relay radio must provide the network. Finally, the sensors S1 and S2 have their own firmware version that calculates their position and displays it locally if desired.

In FIG. 13, each radio link is a two-way link that allows for the passing of information, data and/or information. The data-rates between each radio link is a function of several variables including the number of pulses integrated to get a single bit, the number of bits per data parameter, the length of any headers required in the messages, the range bin size, and the number of radios in the network.

Unlike the radios in the synchronized transceiver tracking architecture, the reference impulse radio units R1–R4 in this architecture are not time-synchronized as a network. These reference impulse radio units R1–R4 operate independently (free-running) and provide ranges to the sensors S1 and S2 either periodically, randomly, or when tasked. Depending upon the application and situation, the reference impulse radio units R1–R4 may or may not talk to other reference radios in the network.

As with the architecture of FIG. 12, the purpose of this impulse radio positioning network 1300 is to enable the tracking of sensors S1 and S2. Tracking is accomplished by stepping through several steps. These steps are dependent upon the way in which the reference impulse radio units R1–R4 range with the sensors S1 and S2 (periodically, randomly, or when tasked). When a sensor S1 or S2 enters the network area, it either listens for reference impulse radio units R1–R4 to broadcast, then responds, or it queries (tasks) the desired reference impulse radio units R1–R4 to respond. The sensor S1 or S2 begins collecting and time-tagging range measurements from reference (or other mobile) radios. The sensor S1 or S2 then takes these time-tagged ranges and, using a least squares-based or similar estimator, calculates the position of the sensor S1 or S2 in local coordinates. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Finally, the sensor S1 or S2 forwards its position calculation to the control station 910 for storage and real-time display.

Synchronized Transmitter Tracking Architecture

Figure 14:
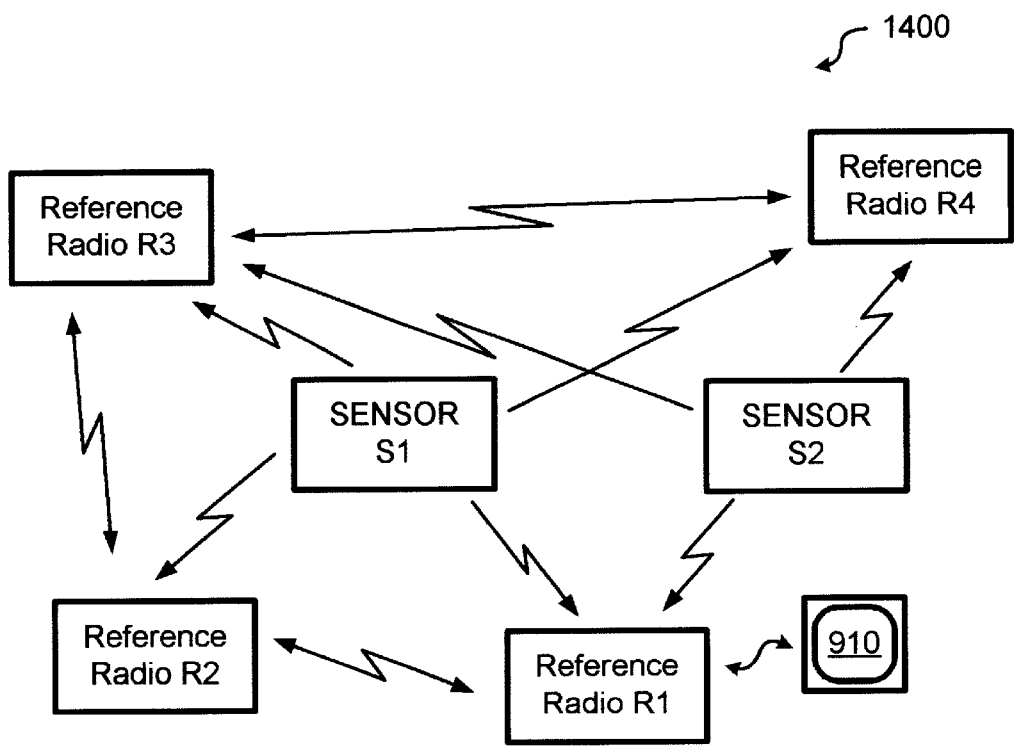
FIG. 14 is a block diagram of an impulse radio positioning network utilizing a synchronized transmitter tracking architecture that can be used in the present invention.

Referring to FIG. 14, there is illustrated a block diagram of an impulse radio positioning network 1400 utilizing a synchronized transmitter tracking architecture. This architecture is perhaps the simplest of the impulse radio positioning architectures, from the point-of-view of the sensors S1 and S2, since the sensors S1 and S2 simply transmit in a free-running sense. The network is designed to be scalable, allowing from very few sensors S1 and S2 and reference impulse radio units R1–R4 to a very large number. This architecture is especially applicable to an "RF tag" (radio frequency tag) type of application.

This particular example of synchronized transmitter tracking architecture shows a network 1400 of four reference impulse radio units radios R1–R4 and two sensors S1 and S2. The arrows between the radios represent two-way and one-way data and/or information links. Notice that the sensors S1 and S2 only transmit, thus they do not receive the transmissions from the other radios.

Each reference impulse radio unit R1–R4 is a two-way transceiver; thus each link between reference impulse radio units R1–R4 is two-way (duplex). Precise ranging information (the distance between two radios) is distributed around the network in such a way as to allow the synchronized reference impulse radio units R1–R4 to receive transmissions from the sensors S1 and S2 and then determine the three-dimensional position of the sensors S1 and S2. This position, along with other data or information traffic, can then be relayed from reference relay impulse radio units R2–R4 back to the reference master impulse radio unit R1 or the control station 910.

The reference impulse radio units R1–R4 used in this architecture are impulse radio two-way transceivers, the sensors S1 and S2 are one-way transmitters. The firmware in the radios varies slightly based on the functions each radio must perform. For example, the reference master impulse radio unit R1 is designated to direct the passing of information, and typically is responsible for collecting all the data for external graphical display at the control station 910. The remaining reference relay impulse radio units R2–R4 contain a separate version of the firmware, the primary difference being the different parameters or information that each reference relay impulse radio unit R2–R4 must provide the network. Finally, the sensors S1 and S2 have their own firmware version that transmits pulses in predetermined sequences.

Each reference radio link is a two-way link that allows for the passing of information, data and/or information. The data-rates between each radio link is a function of several variables including the number of pulses integrated to get a single bit, the number of bits per data parameter, the length of any headers required in the messages, the range bin size, and the number of radios in the network.

By transmitting in assigned time slots and by carefully listening to the other radios transmit in their assigned transmit time slots, the entire group of reference impulse radio units R1–R4 within the network are able to synchronize themselves. The oscillators used on the impulse radio boards drift slowly in time, thus they may require monitoring and adjustment to maintain synchronization. The accuracy of this synchronization process (timing) is dependent upon several factors including, for example, how often and how long each radio transmits along with other factors. The sensors S1 and S2, since they are transmit-only transmitters, are not time-synchronized to the synchronized reference impulse radio units R1–R4.

The purpose of the impulse radio positioning network is to enable the tracking of sensors S1 and S2. Tracking is accomplished by stepping through several well-defined steps. The first step is for the reference impulse radio units R1–R4 to synchronize together and begin passing information. Then, when a sensor S1 or S2 enters the network area and begins to transmit pulses, the reference impulse radio units R1–R4 pick up these pulses as time-of-arrivals (TOAs). Multiple TOAs collected by different synchronized reference impulse radio units R1–R4 are then converted to ranges, which are then used to calculate the XYZ position of the sensor S1 or S2 in local coordinates. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Finally, the reference impulse radio units R1–R4 forwards their position calculation to the control station 910 for storage and real-time display.

Unsynchronized Transmitter Tracking Architecture

Figure 15:
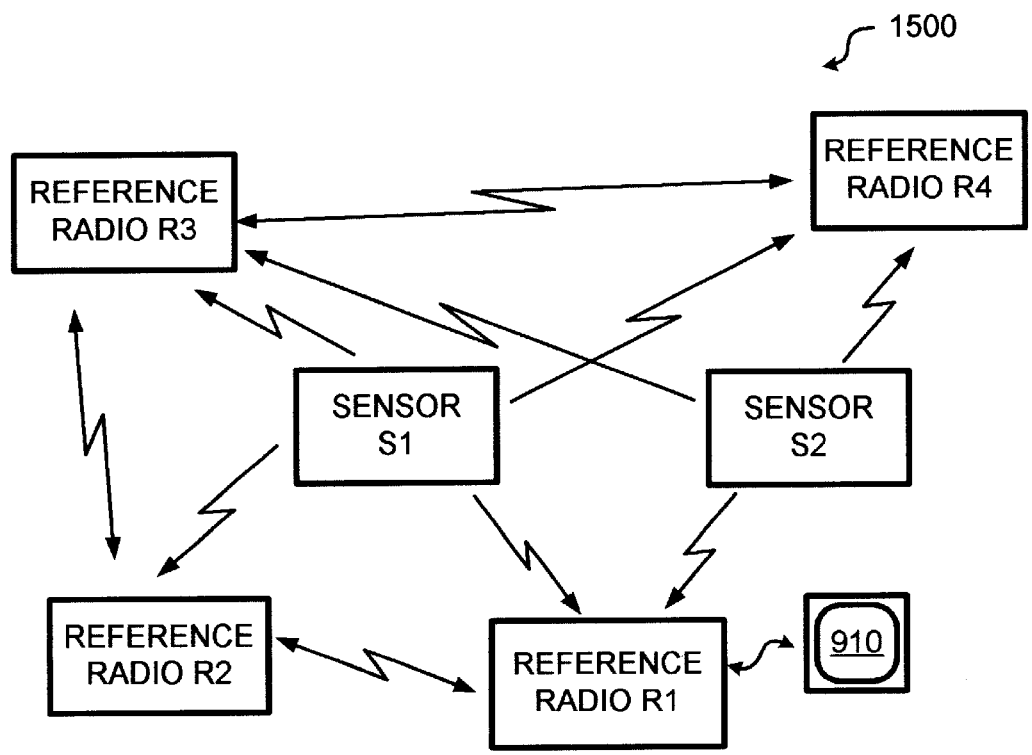
FIG. 15 is a block diagram of an impulse radio positioning network utilizing an unsynchronized transmitter tracking architecture that can be used in the present invention.

Referring to FIG. 15, there is illustrated a block diagram of an impulse radio positioning network 1500 utilizing an unsynchronized transmitter tracking architecture. This architecture is very similar to the synchronized transmitter tracking architecture except that the reference impulse radio units R1–R4 are not synchronized in time. In other words, both the reference impulse radio units R1–R4 and the sensors S1 and S2 are free-running. The network is designed to be scalable, allowing from very few sensors S1 and S2 and reference impulse radio units R1–R4 to a very large number. This architecture is especially applicable to an "RF tag" (radio frequency tag) type of application.

This particular example of the unsynchronized transmitter tracking architecture shows a network 1500 of four reference impulse radio units R1–R4 and two sensors S1 and S2. The arrows between the radios represent two-way and one-way data and/or information links. Notice that the sensors S1 and S2 only transmit, thus they do not receive the transmissions from the other radios. Unlike the synchronous transmitter tracking architecture, the reference impulse radio units R1–R4 in this architecture are free-running (unsynchronized). There are several ways to implement this design, the most common involves relaying the time-of-arrival (TOA) pulses from the sensors S1 and S2 and reference impulse radio units R1–R4, as received at the reference impulse radio units R1–R4, back to the reference master impulse radio unit R1 which communicates with the control station 910.

Each reference impulse radio unit R1–R4 in this architecture is a two-way impulse radio transceiver; thus each link between reference impulse radio unit R1–R4 can be either two-way (duplex) or one-way (simplex). TOA information is typically transmitted from the reference impulse radio units R1–R4 back to the reference master impulse radio unit R1 where the TOAs are converted to ranges and then an XYZ position of the sensor S1 or S2, which can then be forwarded and displayed at the control station 910.

The reference impulse radio units R1–R4 used in this architecture are impulse radio two-way transceivers, the sensors S1 and S2 are one-way impulse radio transmitters. The firmware in the radios varies slightly based on the functions each radio must perform. For example, the reference master impulse radio R1 collects the TOA information, and is typically responsible for forwarding this tracking data to the control station 910. The remaining reference relay impulse radio units R2–R4 contain a separate version of the firmware, the primary difference being the different parameters or information that each reference relay impulse radio units R2–R4 must provide the network. Finally, the sensors S1 and S2 have their own firmware version that transmits pulses in predetermined sequences.

Each reference radio link is a two-way link that allows for the passing of information, data and/or information. The data-rates between each radio link is a function of several variables including the number of pulses integrated to get a single bit, the number of bits per data parameter, the length of any headers required in the messages, the range bin size, and the number of radios in the network.

Since the reference impulse radio units R1–R4 and sensors S1 and S2 are free-running, synchronization is actually done by the reference master impulse radio unit R1. The oscillators used in the impulse radios drift slowly in time, thus they may require monitoring and adjustment to maintain synchronization at the reference master impulse radio unit R1. The accuracy of this synchronization (timing) is dependent upon several factors including, for example, how often and how long each radio transmits along with other factors.

The purpose of the impulse radio positioning network is to enable the tracking of sensors S1 and S2. Tracking is accomplished by stepping through several steps. The most likely method is to have each reference impulse radio unit R1–R4 periodically (randomly) transmit a pulse sequence. Then, when a sensor S1 or S2 enters the network area and begins to transmit pulses, the reference impulse radio units R1–R4 pick up these pulses as time-of-arrivals (TOAs) as well as the pulses (TOAs) transmitted by the other reference radios. TOAs can then either be relayed back to the reference master impulse radio unit R1 or just collected directly (assuming it can pick up all the transmissions). The reference master impulse radio unit R1 then converts these TOAs to ranges, which are then used to calculate the XYZ position of the sensor S1 or S2. If the situation warrants and the conversion possible, the XYZ position can be converted to any one of the worldwide coordinates such as Earth Centered Inertial (ECI), Earth Centered Earth Fixed (ECEF), or J2000 (inertial coordinates fixed to year 2000). Finally, the reference master impulse radio unit R1 forwards its position calculation to the control station 910 for storage and real-time display.

Synchronized Receiver Tracking Architecture

Figure 16:
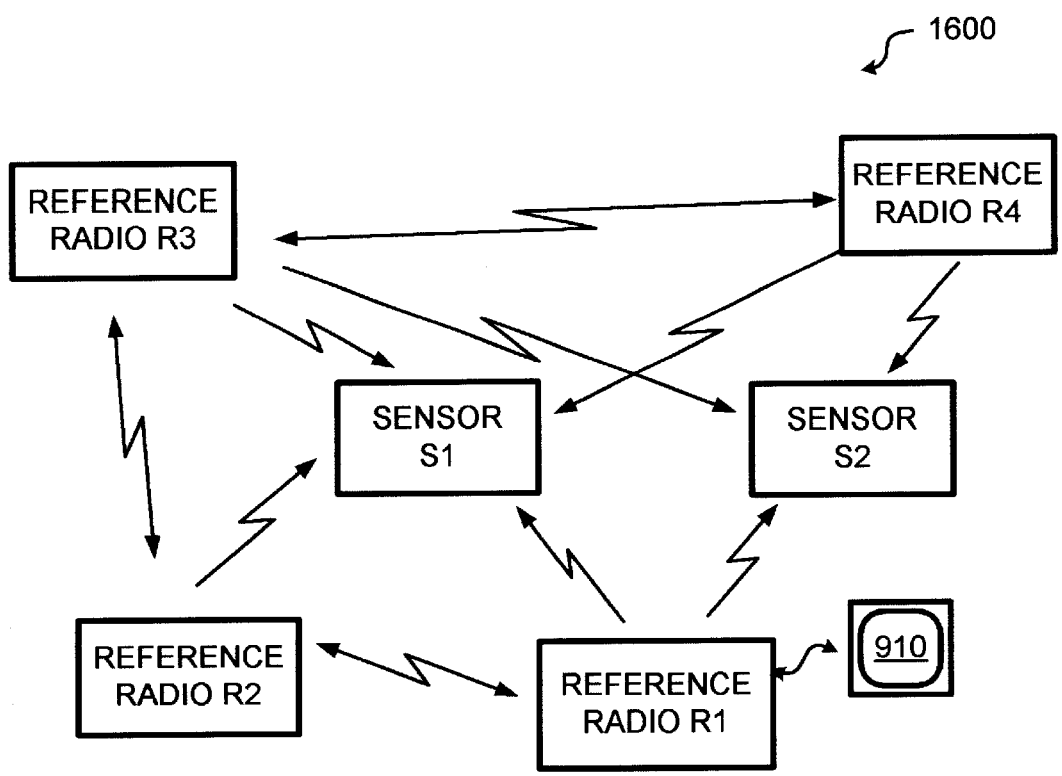
FIG. 16 is a block diagram of an impulse radio positioning network utilizing a synchronized receiver tracking architecture that can be used in the present invention.

Referring to FIG. 16, there is illustrated a block diagram of an impulse radio positioning network 1600 utilizing a synchronized receiver tracking architecture. This architecture is different from the synchronized transmitter tracking architecture in that in this design the sensors S1 and S2 determine their positions but are not able to broadcast it to anyone since they are receive-only radios. The network is designed to be scalable, allowing from very few sensors S1 and S2 and reference impulse radio units R1–R4 to a very large number.

This particular example of the synchronized receiver tracking architecture shows a network 1600 of four reference impulse radio units R1–R4 and two sensors S1 and S2. The arrows between the radios represent two-way and one-way data and/or information links. Notice that the sensors S1 and S2 receive transmissions from other radios, and do not transmit.

Each reference impulse radio unit R1–R4 is a two-way transceiver, and each sensor S1 and S2 is a receive-only radio. Precise, synchronized pulses are transmitted by the reference network and received by the reference impulse radio units R1–R4 and the sensors S1 and S2. The sensors S1 and S2 take these times-of-arrival (TOA) pulses, convert them to ranges, then determine their XYZ positions. Since the sensors S1 and S2 do not transmit, only they themselves know their XYZ positions.

The reference impulse radio units R1–R4 used in this architecture are impulse radio two-way transceivers, the sensors S1 and S2 are receive-only radios. The firmware for the radios varies slightly based on the functions each radio must perform. For example, the reference master impulse radio unit R1 is designated to direct the synchronization of the reference radio network. The remaining reference relay impulse radio units R2–R4 contain a separate version of the firmware, the primary difference being the different parameters or information that each reference relay impulse radio unit R2–R4 must provide the network. Finally, the sensors S1 and S2 have their own firmware version that calculates their position and displays it locally if desired.

Each reference radio link is a two-way link that allows for the passing of information, data and/or information. The sensors S1 and S2 are receive-only. The data-rates between each radio link is a function of several variables including the number of pulses integrated to get a single bit, the number of bits per data parameter, the length of any headers required in the messages, the range bin size, and the number of radios in the network.

By transmitting in assigned time slots and by carefully listening to the other reference impulse radio units R1–R4 transmit in their assigned transmit time slots, the entire group of reference impulse radio units R1–R4 within the network are able to synchronize themselves. The oscillators used on the impulse radio boards may drift slowly in time, thus they may require monitoring and adjustment to maintain synchronization. The accuracy of this synchronization (timing) is dependent upon several factors including, for example, how often and how long each radio transmits along with other factors.

The purpose of the impulse radio positioning network is to enable the tracking of sensors S1 and S2. Tracking is accomplished by stepping through several well-defined steps. The first step is for the reference impulse radio units R1–R4 to synchronize together and begin passing information. Then, when a sensor S1 or S2 enters the network area, it begins receiving the time-of-arrival (TOA) pulses from the reference radio network. These TOA pulses are converted to ranges, then the ranges are used to determine the XYZ position of the sensor S1 or S2 in local coordinates using a least squares-based estimator. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000).

Unsynchronized Receiver Tracking Architecture

Figure 17:
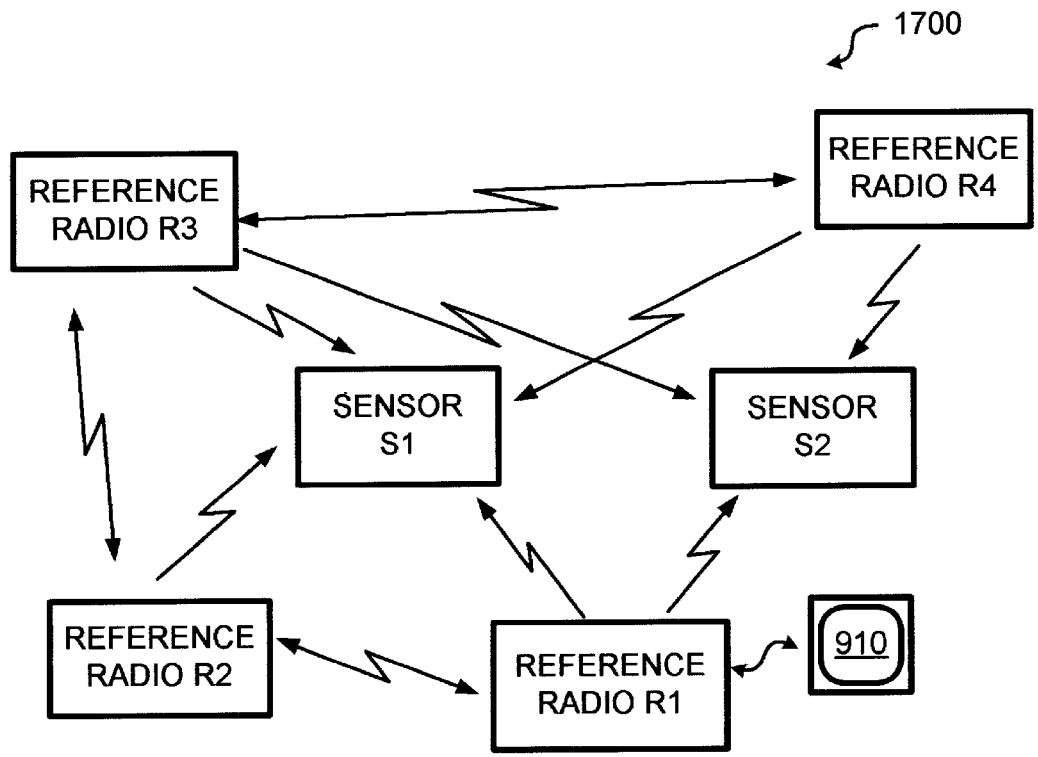
FIG. 17 is a block diagram of an impulse radio positioning network utilizing an unsynchronized receiver tracking architecture that can be used in the present invention.

Referring to FIG. 17, there is illustrated a block diagram of an impulse radio positioning network 1700 utilizing an unsynchronized receiver tracking architecture. This architecture is different from the synchronized receiver tracking architecture in that in this design the reference impulse radio units R1–R4 are not time-synchronized. Similar to the synchronized receiver tracking architecture, sensors S1 and S2 determine their positions but cannot broadcast them to anyone since they are receive-only radios. The network is designed to be scalable, allowing from very few sensors S1 and S2 and reference impulse radio units R1–R4 to a very large number.

This particular example of the unsynchronized receiver tracking architecture shows a network 1700 of four reference impulse radio units R1–R4 and two sensors S1 and S2. The arrows between the radios represent two-way and one-way data and/or information links. Notice that the sensors S1 and S2 only receive transmissions from other radios, and do not transmit.

Each reference impulse radio unit R1–R4 is an impulse radio two-way transceiver, each sensor S1 and S2 is a receive-only impulse radio. Precise, unsynchronized pulses are transmitted by the reference network and received by the other reference impulse radio units R1–R4 and the sensors S1 and S2. The sensors S1 and S2 take these times-of-arrival (TOA) pulses, convert them to ranges, and then determine their XYZ positions. Since the sensors S1 and S2 do not transmit, only they themselves know their XYZ positions.

The reference impulse radio units R1–R4 used in this architecture are impulse radio two-way transceivers, the sensors S1 and S2 are receive-only radios. The firmware for the radios varies slightly based on the functions each radio must perform. For this design, the reference master impulse radio unit R1 may be used to provide some synchronization information to the sensors S1 and S2. The sensors S1 and S2 know the XYZ position for each reference impulse radio unit R1–R4 and as such they may do all of the synchronization internally.

The data-rates between each radio link is a function of several variables including the number of pulses integrated to get a single bit, the number of bits per data parameter, the length of any headers required in the messages, the range bin size, and the number of impulse radios in the network.

For this architecture, the reference impulse radio units R1–R4 transmit in a free-running (unsynchronized) manner. The oscillators used on the impulse radio boards often drift slowly in time, thus requiring monitoring and adjustment of synchronization by the reference master impulse radio unit R1 or the sensors S1 and S2 (whomever is doing the synchronization). The accuracy of this synchronization (timing) is dependent upon several factors including, for example, how often and how long each radio transmits.

The purpose of the impulse radio positioning network is to enable the tracking sensors S1 and S2. Tracking is accomplished by stepping through several steps. The first step is for the reference impulse radio units R1–R4 to begin transmitting pulses in a free-running (random) manner. Then, when a sensor S1 or S2 enters the network area, it begins receiving the time-of-arrival (TOA) pulses from the reference radio network. These TOA pulses are converted to ranges, then the ranges are used to determine the XYZ position of the sensor S1 or S2 in local coordinates using a least squares-based estimator. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000).

Mixed Mode Tracking Architecture

For ease of reference, in FIGS. 18–23 the below legend applies.

| Symbols and Definitions | |
|---|---|
| ⊗ | Receiver Radio (receive only) |
| X | Transmitter Radio (transmit only) |
| ⊗ | Transceiver Radio (receive and transmit) |
| $R_i$ | Reference Radio (fixed location) |
| $M_i$ | Mobile Radio (radio being tracked) |
| ⤄ | Duplex Radio Link |
| → | Simplex Radio Link |
| TOA, DTOA | Time of Arrival, Differenced TOA |

Figure 18:
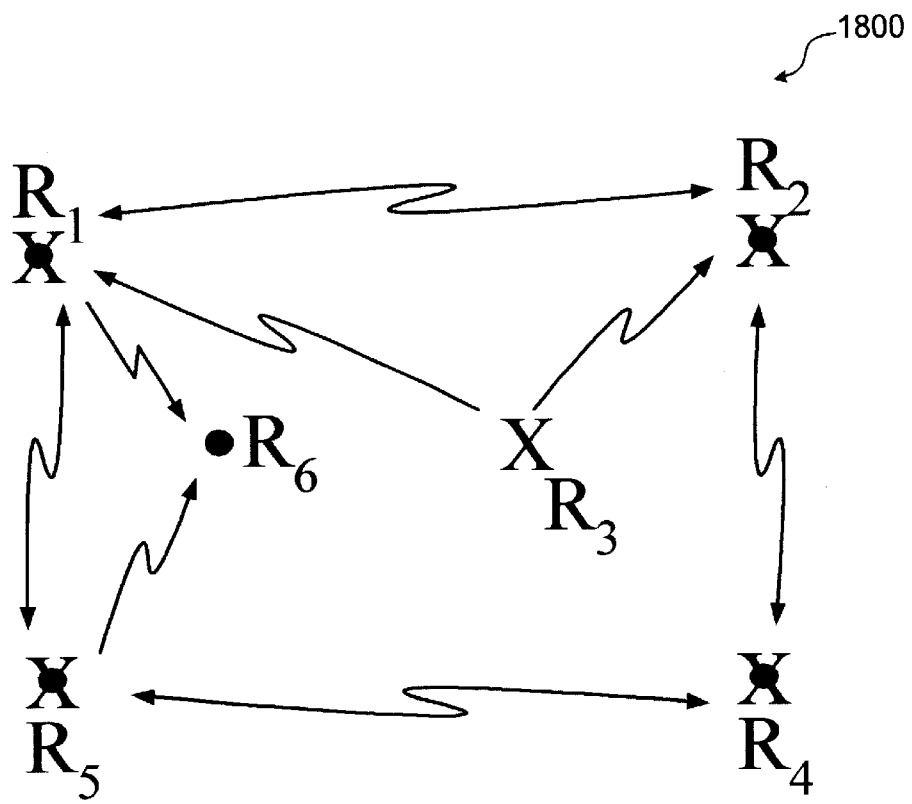
FIG. 18 is a diagram of an impulse radio positioning network utilizing a mixed mode reference radio tracking architecture that can be used in the present invention.

Referring to FIG. 18, there is illustrated a diagram of an impulse radio positioning network 1800 utilizing a mixed mode reference radio tracking architecture. This architecture defines a network of reference impulse radio units R1–R6 comprised of any combination of transceivers ($R_1$, $R_2$, $R_4$, $R_5$), transmitters ($R_3$), and receivers ($R_6$). Sensors (none shown) entering this mixed-mode reference network use whatever reference radios are appropriate to determine their positions.

Figure 19:
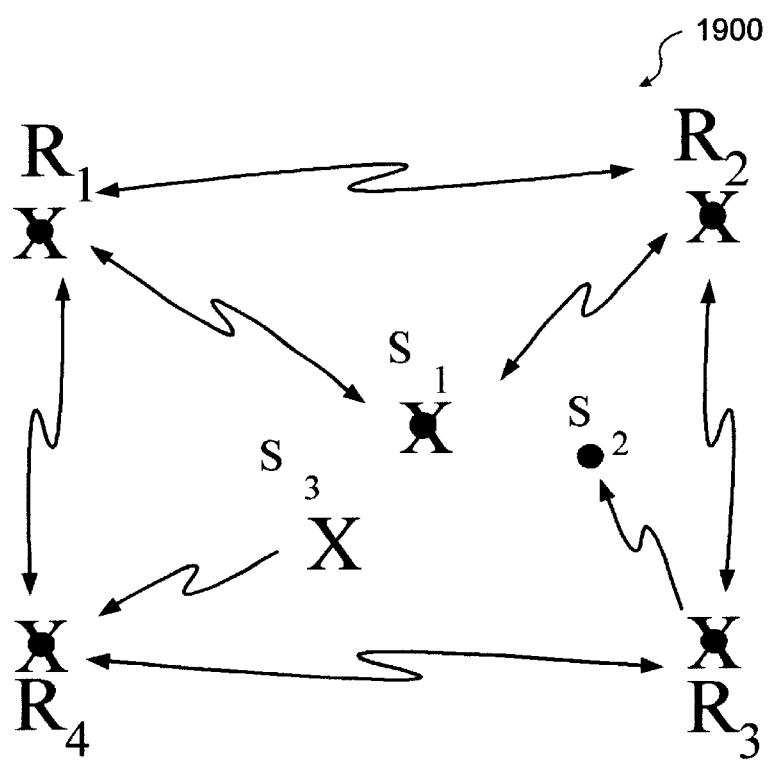
FIG. 19 is a diagram of an impulse radio positioning network utilizing a mixed mode mobile apparatus tracking architecture that can be used in the present invention.

Referring to FIG. 19, there is a diagram of an impulse radio positioning network 1900 utilizing a mixed mode mobile apparatus tracking architecture. Herein, the sensors S1–S3 are mixed mode and reference impulse radio units R1–R4 are likely time-synched. In this illustrative example, the sensor S1 is a transceiver, sensor S2 is a transmitter, and sensor S3 is a receiver. The reference impulse radio units R1–R4 can interact with different types of sensors S1–S3 to help in the determination of the positions of the mobile apparatuses.

Antennae Architectures

Figure 20:
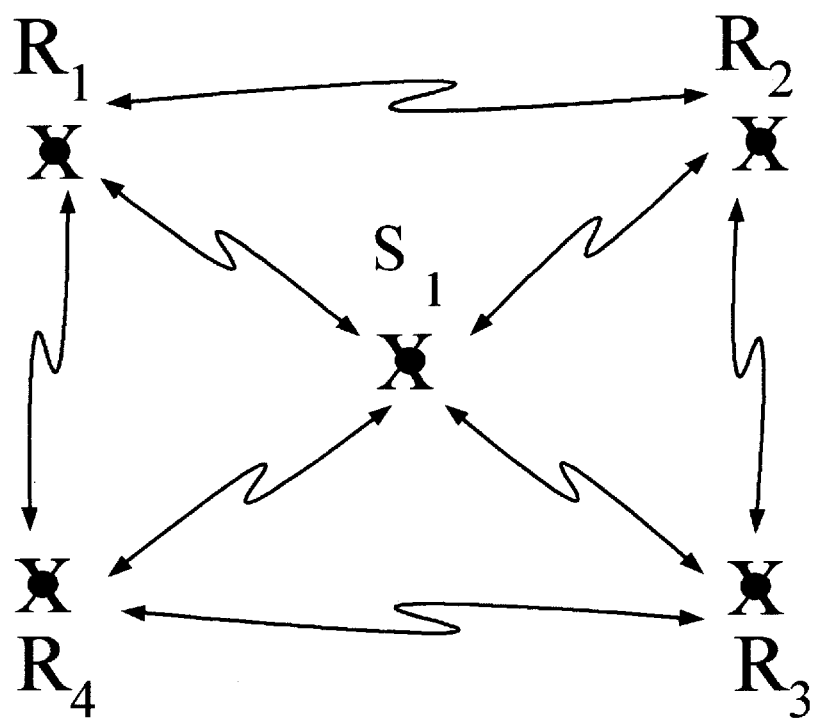
FIG. 20 is a diagram of a steerable null antennae architecture capable of being used in an impulse radio positioning network in accordance the present invention.

Referring to FIG. 20, there is illustrated a diagram of a steerable null antennae architecture capable of being used in an impulse radio positioning network. The aforementioned impulse radio positioning networks can implement and use steerable null antennae to help improve the impulse radio distance calculations. For instance, all of the reference impulse radio units R1–R4 or some of them can utilize steerable null antenna designs to direct the impulse propagation; with one important advantage being the possibility of using fewer reference impulse radio units or improving range and power requirements. The sensor S1 can also incorporate and use a steerable null antenna.

Figure 21:
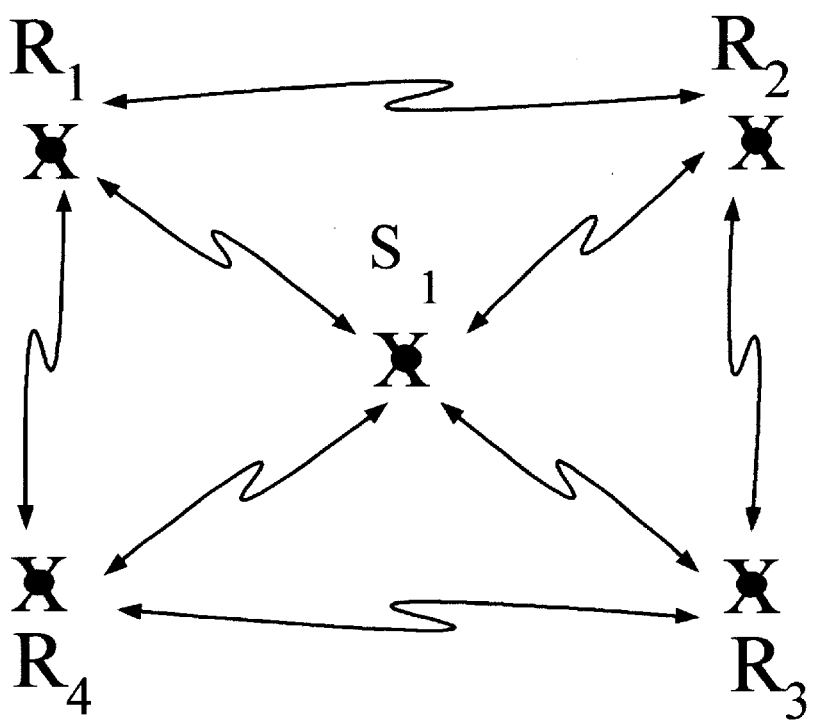
FIG. 21 is a diagram of a specialized difference antennae architecture capable of being used in an impulse radio positioning network in accordance the present invention.

Referring to FIG. 21, there is illustrated a diagram of a specialized difference antennae architecture capable of being used in an impulse radio positioning network. The reference impulse radio units R1–R4 of this architecture may use a difference antenna analogous to the phase difference antenna used in GPS carrier phase surveying. The reference impulse radio units R1–R4 should be time synched and the sensor S1 should be able to transmit and receive.

Figure 22:
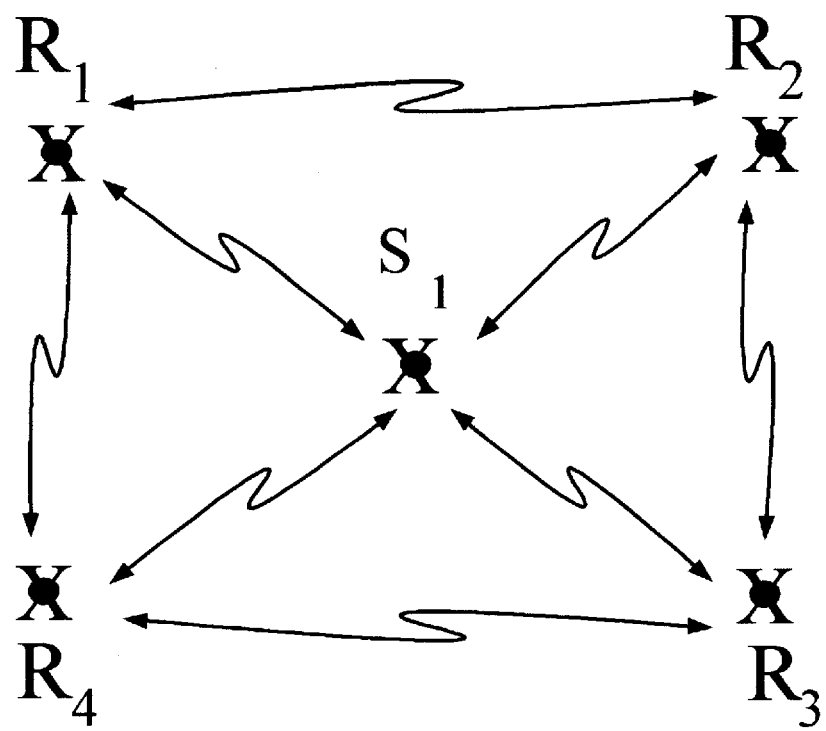
FIG. 22 is a diagram of a specialized directional antennae architecture capable of being used in an impulse radio positioning network in accordance with the present invention.

Referring to FIG. 22, there is illustrated a diagram of a specialized directional antennae architecture capable of being used in an impulse radio positioning network. As with the steerable null antennae design, the implementation of this architecture is often driven by design requirements. The reference impulse radio units R1–R4 and the mobile apparatus A1 can incorporate a directional antennae. In addition, the reference impulse radio units R1–R4 are likely time-synched.

Figure 23:
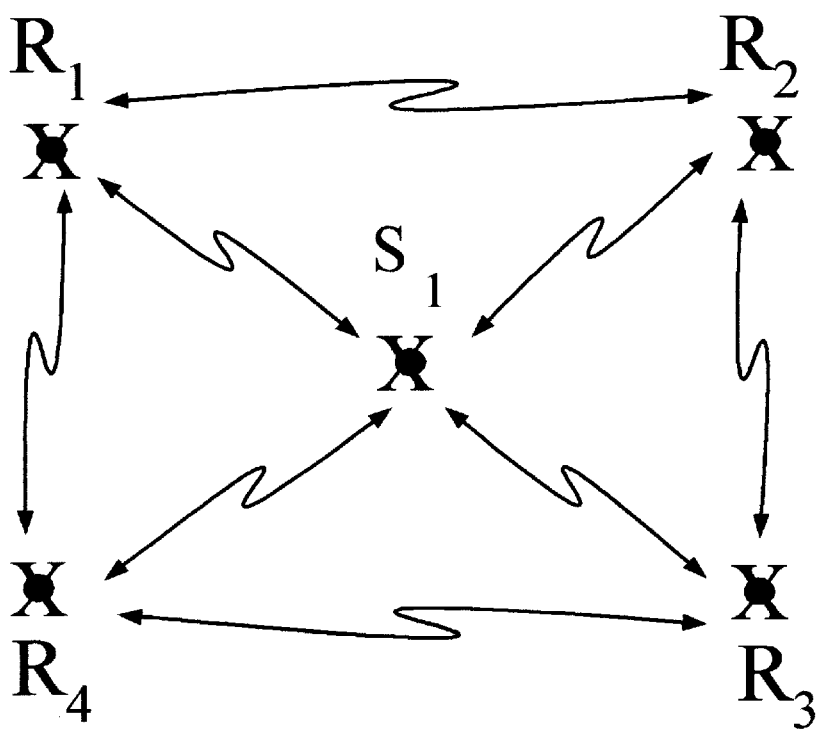
FIG. 23 is a diagram of an amplitude sensing architecture capable of being used in an impulse radio positioning network in accordance with the present invention.

Referring to FIG. 23, there is illustrated a diagram of an amplitude sensing architecture capable of being used in an impulse radio positioning network. Herein, the reference impulse radio units R1–R4 are likely time-synched. Instead of the sensor S1 and reference impulse radio units R1–R2 measuring range using TOA methods (round-trip pulse intervals), signal amplitude is used to determine range. Several implementations can be used such as measuring the "absolute" amplitude and using a pre-defined look up table that relates range to "amplitude" amplitude, or "relative" amplitude where pulse amplitudes from separate radios are differenced. Again, it should be noted that in this, as all architectures, the number of radios is for illustrative purposes only and more than one mobile impulse radio can be implemented in the present architecture.

Although various embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A sensor comprising:
a first ultra wideband carrier wave-less impulse radio unit for transmitting an impulse radio signal containing sensor related information to a second ultra wideband carrier wave-less impulse radio unit, wherein the received sensor related information is used by a control station to monitor at least one condition within a building.

2. The sensor of claim 1, wherein said sensor related information further includes environmental related information that indicates a temperature or humidity within the building.

3. The sensor of claim 1, wherein said sensor related information further includes safety related information that indicates a presence of carbon monoxide or smoke within the building.

4. The sensor of claim 1, wherein said sensor related information further includes surveillance related information that indicates a presence of a visitor or an intruder within the building.

5. The sensor of claim 1, wherein when a person moves the sensor around within the building then impulse radio technology is used to determine a position of the sensor within the building.

6. A method for monitoring at least one condition within a building, said method comprising the steps of:
attaching a first ultra wideband carrier wave-less impulse radio unit to a sensor; and
transmitting, from the first ultra wideband carrier wave-less impulse radio unit, an impulse radio signal containing sensor related information to a second ultra wideband carrier wave-less impulse radio unit, wherein the received sensor related information is used by a control station to monitor the at least one condition within the building.

7. The method of claim 6, wherein said sensor related information further includes environmental related information that indicates the temperature or humidity within the building.

8. The method of claim 6, wherein said sensor related information further includes safety related information that indicates the presence of carbon monoxide or smoke within the building.

9. The method claim 6, wherein said sensor related information further includes surveillance related information that indicates the presence of a visitor or an intruder within the building.

10. The method of claim 6, further comprising the step of determining a position of the sensor that was moved within the building, wherein the position of the sensor is determined from the interaction between the first ultra wideband carrier wave-less impulse radio unit and at least two reference ultra wideband carrier wave-less impulse radio units.

11. A sensor comprising:
sensing means for sensing a least one condition within a building and generating sensor related information related to the at least one condition within the building; and
a first ultra wideband carrier wave-less impulse radio unit for transmitting an impulse radio signal having a plurality of pulses resembling a series Gaussian waveforms that contain the sensor related information to a second ultra wideband carrier wave-less impulse radio unit, wherein the sensor related information received by the second ultra wideband carrier wave-less impulse radio unit is used by a control station to monitor at least one condition within a building.

12. The sensor of claim 11, wherein said at least one condition includes a temperature or a humidity within the building.

13. The sensor of claim 11, wherein said at least one condition includes the presence of carbon monoxide or smoke within the building.

14. The sensor of claim 11, wherein when a person moves the sensor around within the building then at least two reference ultra wideband carrier wave-less impulse radio units are used to determine a position of the sensor within the building.

15. The sensor of claim 11, wherein said first ultra wideband carrier wave-less impulse radio unit also functions as a radar to determine a presence of a visitor or an intruder within the building.

16. A method for monitoring at least one condition within a building, said method comprising the steps of:
attaching a first ultra wideband carrier wave-less impulse radio unit to a sensor; and
transmitting, from the first ultra wideband carrier wave-less impulse radio unit, an impulse radio signal having a plurality of pulses resembling a series of Gaussian waveforms that contain sensor related information to a second ultra wideband carrier wave-less impulse radio unit, wherein the received sensor related information is used by a control station to monitor the at least one condition within the building.

17. The method of claim 16, wherein said at least one condition includes a temperature or a humidity within the building.

18. The method of claim 16, wherein said at least one condition includes the presence of carbon monoxide or smoke within the building.

19. The method of claim 16, wherein when a person moves the sensor around within the building then a positioning capability of ultra wideband impulse radio technology is used to determine a position of the sensor within the building.

20. The method of claim 16, wherein said first ultra wideband carrier wave-less impulse radio unit uses a radar capability of ultra wideband impulse radio technology to determine a presence of a visitor or an intruder within the building.

* * * * *